US012525354B2

(12) United States Patent
Singh et al.

(10) Patent No.: US 12,525,354 B2
(45) Date of Patent: Jan. 13, 2026

(54) MACHINE LEARNING TECHNIQUES FOR FUTURE OCCURRENCE CODE PREDICTION

(71) Applicant: Optum Technology, Inc., Eden Prairie, MN (US)

(72) Inventors: Rama Krishna Singh, Greater Noida (IN); Ravi Pande, Noida (IN); Priyank Jain, Noida (IN)

(73) Assignee: Optum Technology, Inc., Eden Prairie, MN (US)

( * ) Notice: Subject to any disclaimer, the term of this patent is extended or adjusted under 35 U.S.C. 154(b) by 1139 days.

(21) Appl. No.: 17/374,540

(22) Filed: Jul. 13, 2021

(65) Prior Publication Data

US 2023/0017734 A1    Jan. 19, 2023

(51) Int. Cl.
| | | |
|---|---|---|
| G06N 20/00 | (2019.01) | |
| G06F 18/23 | (2023.01) | |
| G06F 40/20 | (2020.01) | |
| G16H 50/20 | (2018.01) | |

(52) U.S. Cl.
CPC .............. G16H 50/20 (2018.01); G06F 18/23 (2023.01); G06F 40/20 (2020.01); G06N 20/00 (2019.01)

(58) Field of Classification Search
CPC ........ G06N 20/00; G16H 50/20; G06F 18/23; G06F 40/20
See application file for complete search history.

(56) References Cited

U.S. PATENT DOCUMENTS

| | | | |
|---|---|---|---|
| 6,110,109 A | 8/2000 | Hu et al. | |
| 8,700,337 B2 | 4/2014 | Dudley et al. | |
| 9,910,962 B1 | 3/2018 | Fakhrai-Rad et al. | |
| 10,867,702 B2 * | 12/2020 | Athey | G16H 50/20 |
| 11,322,260 B1 * | 5/2022 | Jain | H04W 4/021 |

(Continued)

FOREIGN PATENT DOCUMENTS

| | | | |
|---|---|---|---|
| CN | 106778014 B | | 6/2020 |
| CN | 113053503 A | * | 6/2021 |

(Continued)

OTHER PUBLICATIONS

Christensen et al., "Machine Learning Methods for Disease Prediction with Claims Data", 2018, IEEE International Conference of Healthcare Informatics, pp. 467-471. (Year: 2018).*

(Continued)

*Primary Examiner* — Paulinho E Smith
(74) *Attorney, Agent, or Firm* — Alston & Bird LLP

(57) ABSTRACT

Various embodiments of the present invention provide methods, apparatus, systems, computing devices, computing entities, and/or the like for performing predictive structural analysis. Certain embodiments of the present invention utilize systems, methods, and computer program products that perform predictive structural analysis using at least one of techniques using time bound code transition likelihood data objects, techniques using cross-code relationship values, techniques using augmented entity-code occurrence data objects, techniques using per-pathway text representations of inferred occurrence pathways of a one or more individual historic code occurrences, techniques using polygenic risk score (PRS) measures, and/or the like.

20 Claims, 15 Drawing Sheets

(56) References Cited

U.S. PATENT DOCUMENTS

| | | | | |
|---|---|---|---|---|
| 12,154,039 | B2* | 11/2024 | Singh | G16H 50/20 |
| 12,165,769 | B2* | 12/2024 | Mitteldorf | A61B 5/02055 |
| 2006/0095853 | A1* | 5/2006 | Amyot | G16H 50/70 |
| | | | | 715/744 |
| 2008/0183454 | A1* | 7/2008 | Barabasi | G16H 50/70 |
| | | | | 703/11 |
| 2010/0070455 | A1 | 3/2010 | Halperin et al. | |
| 2015/0213225 | A1 | 7/2015 | Amarasingham et al. | |
| 2016/0283679 | A1* | 9/2016 | Hu | G06N 7/01 |
| 2018/0260925 | A1* | 9/2018 | Gotz | G16H 50/70 |
| 2019/0065689 | A1* | 2/2019 | O'Malley | G16H 50/50 |
| 2021/0343362 | A1* | 11/2021 | Bryan | G06F 17/18 |
| 2022/0028550 | A1* | 1/2022 | Ng | A61B 5/4848 |
| 2022/0082574 | A1* | 3/2022 | Watanabe | G06N 3/02 |
| 2022/0093272 | A1* | 3/2022 | Lerner | G06N 7/01 |
| 2022/0188664 | A1* | 6/2022 | Singh | G16H 50/20 |
| 2022/0300835 | A1* | 9/2022 | Ghosh | G06F 8/10 |
| 2022/0383982 | A1* | 12/2022 | Bridges | G16B 40/20 |
| 2023/0016569 | A1* | 1/2023 | Koyejo | G06T 7/0012 |
| 2023/0017734 | A1* | 1/2023 | Singh | G06F 40/20 |
| 2023/0225947 | A1* | 7/2023 | Zuleta | A61J 7/0427 |
| | | | | 221/2 |
| 2024/0029896 | A1* | 1/2024 | Nguyen | G16H 50/20 |

FOREIGN PATENT DOCUMENTS

| | | | |
|---|---|---|---|
| CN | 113537709 A | * | 10/2021 |
| KR | 10-2087613 B1 | | 3/2020 |
| WO | 2020/056389 A1 | | 3/2020 |

OTHER PUBLICATIONS

Wartelle et al., "Clustering of a Health Dataset Using Diagnosis Co-Occurrences", Mar. 7, 2021, Applied Sciences, pp. 1-19 (Year: 2021).*

Cao et al., "Mining a Clinical Data Warehouse to discover Disease-finding Associations using Co-Ooccurrence Statistics", AMIA 2005 Symposium Proceedings, pp. 106-110. (Year: 2005).*

Hanaeur et al., "Modeling temporal relationships in large scale clinical associations", Sep. 17, 2012, Journal Am Med Inform Association, pp. 1-10 (Year: 2012).*

Razavian et al., "Temporal Convolutional Neural Networks for Diagnosis from Lab Tests", Mar. 11, 2016, arXiv.com, pp. 1-19 (Year: 2016).*

"icd10-E083: Diabetes Mellitus Due to Underlying Condition With Ophthalmic Complications," 1UPhEALTH, (article, online), (3 pages), [Retrieved from the Internet Sep. 18, 2021] <https://1up.health/health-data/icd10/id/E083>.

"Understanding the ICD-10 Code Structure," Health Network Solutions, (article, online), (6 pages), [Retrieved from the Internet Sep. 18, 2021] <https://www.healthnetworksolutions.net/index.php/understanding-the-icd-10-code-structure>.

Chawla, Nitesh V. et al. "Bringing Big Data To Personalized Healthcare: A Patient-Centered Framework," Journal of General Internal Medicine, Sep. 1, 2013, vol. 28, No. pp. S660-S665, (Published Online: Jun. 25, 2013).

Choi, Edward et al. "Multi-Layer Representation Learning For Medical Concepts," arXiv Preprint arXiv:1602.05568v1, Feb. 17, 2016, pp. 1-20.

Futoma, Joseph et al. "Predicting Disease Progression with a Model for Multivariate Longitudinal Clinical Data," Proceedings of Machine Learning For Healthcare, vol. 56, Dec. 10, 2016, (12 pages).

Hane, Christopher A. et al. "Predicting Onset of Dementia Using Clinical Notes and Machine Learning: Case-Control Study," Journal of Medical Internet Research, vol. 8, No. 6:e17819, Jun. 3, 2020, DOI: 10.2196/17819, PMID: 32490841, PMCID: 7301255.

Kartchner, David et al. "Code2Vec: Embedding and Clustering Medical Diagnosis Data," 2017 IEEE International Conference on Healthcare Informatics (ICHI), Aug. 23, 2017, DOI: 10.1109/ICHI.2017.94.

Kaushik, Kulvaibhav et al. "Disease Management: Clustering-Based Disease Prediction," International Journal Of Collaborative Enterprise, vol. 4, Nos. 102, Jan. 2014, pp. 69-82, DOI: 10.1504/IJCENT.2014.065047.

Krzanowski, W.J. "Missing Value Imputation In Multivariate Data Using The Singular Value Decomposition Of A Matrix," Listy Biometryczne—Biometrical Letters, vol. XXV, No. 1,2, (1988), pp. 31-39.

* cited by examiner

| Mem ID | Claim | Date | Diag 1 | Diag 2 | Diag 3 | Diag 4 | Diag 5 |
|---|---|---|---|---|---|---|---|
| M1 | C1 | 1-Jan-16 | DA1 | DA2 | DA3 | | |
| M1 | C2 | 11-Jan-16 | DA4 | DA5 | DA6 | DA7 | |
| M2 | C1 | 10-Mar-16 | DA1 | | | | |
| M2 | C2 | 20-Mar-16 | DA2 | DA4 | | | |
| M2 | C3 | 19-Apr-16 | DA3 | DA6 | DA7 | | |
| M2 | C4 | 19-May-16 | DA5 | | | | |

FIG. 9

| Mem ID | Claim 1 | Date 1 | Diag CD1 |
|---|---|---|---|
| M1 | C1 | 1-Jan-16 | DA1 |
| M1 | C1 | 1-Jan-16 | DA2 |
| M1 | C1 | 1-Jan-16 | DA3 |
| M1 | C2 | 10-Jan-16 | DA4 |
| M1 | C2 | 10-Jan-16 | DA5 |
| M1 | C2 | 10-Jan-16 | DA6 |
| M1 | C2 | 10-Jan-16 | DA7 |
| M2 | C1 | 10-Mar-16 | DA1 |
| M2 | C2 | 20-Mar-16 | DA2 |
| M2 | C3 | 19-Apr-16 | DA3 |
| M2 | C3 | 19-Apr-16 | DA4 |
| M2 | C4 | 19-May-16 | DA5 |
| M2 | C4 | 19-May-16 | DA6 |
| M2 | C4 | 19-May-16 | DA7 |

| Mem ID | Claim No 1 | Date1 | Diag CD1 (1101) | Claim No 2 | Date2 | Diag CD2 (1102) | Datecutoff in days | date diff in months (1103) |
|---|---|---|---|---|---|---|---|---|
| M1 | C1 | 1-Jan-16 | DA1 | C2 | 11-Jan-16 | DA4 | 10 | 0 |
| M1 | C1 | 1-Jan-16 | DA1 | C2 | 11-Jan-16 | DA5 | 10 | 0 |
| M1 | C1 | 1-Jan-16 | DA1 | C2 | 11-Jan-16 | DA6 | 10 | 0 |
| M1 | C1 | 1-Jan-16 | DA2 | C2 | 11-Jan-16 | DA7 | 10 | 0 |
| M1 | C1 | 1-Jan-16 | DA2 | C2 | 11-Jan-16 | DA4 | 10 | 0 |
| M1 | C1 | 1-Jan-16 | DA2 | C2 | 11-Jan-16 | DA5 | 10 | 0 |
| M1 | C1 | 1-Jan-16 | DA3 | C2 | 11-Jan-16 | DA6 | 10 | 0 |
| M1 | C1 | 1-Jan-16 | DA3 | C2 | 11-Jan-16 | DA4 | 10 | 0 |
| M1 | C1 | 1-Jan-16 | DA3 | C2 | 11-Jan-16 | DA5 | 10 | 0 |
| M1 | C1 | 1-Jan-16 | DA3 | C2 | 11-Jan-16 | DA7 | 10 | 0 |
| M2 | C3 | 10-Mar-16 | DA1 | C3 | 20-Mar-16 | DA3 | 10 | 2 |
| M2 | C3 | 10-Mar-16 | DA1 | C4 | 19-May-16 | DA4 | 40 | 2 |
| M2 | C3 | 10-Mar-16 | DA1 | C4 | 19-May-16 | DA5 | 70 | 2 |
| M2 | C3 | 20-Mar-16 | DA1 | C4 | 19-May-16 | DA6 | 70 | 2 |
| M2 | C3 | 20-Mar-16 | DA1 | C4 | 19-May-16 | DA7 | 70 | 2 |
| M2 | C3 | 20-Mar-16 | DA2 | C4 | 19-May-16 | DA3 | 30 | 3 |
| M2 | C3 | 20-Mar-16 | DA3 | C4 | 19-May-16 | DA4 | 30 | 3 |
| M2 | C3 | 20-Mar-16 | DA3 | C4 | 19-May-16 | DA5 | 30 | 3 |
| M2 | C3 | 19-Apr-16 | DA3 | C4 | 19-May-16 | DA6 | 30 | 3 |
| M2 | C3 | 19-Apr-16 | DA4 | C4 | 19-May-16 | DA3 | 30 | 3 |
| M2 | C3 | 19-Apr-16 | DA4 | C4 | 19-May-16 | DA5 | 30 | 3 |
| M2 | C3 | 19-Apr-16 | DA4 | C4 | 19-May-16 | DA7 | 30 | 3 |

| Disease Disease combinations | Target | Confidence |
|---|---|---|
| {DISORDERS OF LIPID METABOLISM} | {ESSENTIAL HYPERTENSION} | 53% |
| {ESSENTIAL HYPERTENSION} | {DISORDERS OF LIPID METABOLISM} | 38% |
| {DIABETES MELLITUS WITHOUT COMP} | {ESSENTIAL HYPERTENSION} | 43% |
| {ESSENTIAL HYPERTENSION} | {DIABETES MELLITUS WITHOUT COMP} | 26% |
| {CHRONIC KIDNEY DISEASE} | {DEFICIENCY AND OTHER ANEMIA} | 51% |
| {DEFICIENCY AND OTHER ANEMIA} | {CHRONIC KIDNEY DISEASE} | 46% |
| {DIABETES MELLITUS WITHOUT COMP} | {DISORDERS OF LIPID METABOLISM} | 33% |
| {DISORDERS OF LIPID METABOLISM} | {DIABETES MELLITUS WITHOUT COMP} | 25% |
| {OTHER DISEASES OF KIDNEY AND U} | {CHRONIC KIDNEY DISEASE} | 76% |
| {CHRONIC KIDNEY DISEASE} | {OTHER DISEASES OF KIDNEY AND U} | 32% |
| {OTHER DISEASES OF KIDNEY AND U} | {DEFICIENCY AND OTHER ANEMIA} | 65% |
| {DEFICIENCY AND OTHER ANEMIA} | {OTHER DISEASES OF KIDNEY AND U} | 27% |
| {CORONARY ATHEROSCLEROSIS AND O} | {ESSENTIAL HYPERTENSION} | 38% |
| {ESSENTIAL HYPERTENSION} | {CORONARY ATHEROSCLEROSIS AND O} | 12% |
| {DEFICIENCY AND OTHER ANEMIA,OTHER DISEASES OF KIDNEY AND U} | {CHRONIC KIDNEY DISEASE} | 92% |
| {CHRONIC KIDNEY DISEASE,OTHER DISEASES OF KIDNEY AND U} | {DEFICIENCY AND OTHER ANEMIA} | 80% |
| {CHRONIC KIDNEY DISEASE,DEFICIENCY AND OTHER ANEMIA} | {OTHER DISEASES OF KIDNEY AND U} | 56% |
| {DIABETES MELLITUS WITHOUT COMP,DISORDERS OF LIPID METABOLISM} | {ESSENTIAL HYPERTENSION} | 57% |
| {DIABETES MELLITUS WITHOUT COMP,ESSENTIAL HYPERTENSION} | {DISORDERS OF LIPID METABOLISM} | 41% |

FIG. 13

MACHINE LEARNING TECHNIQUES FOR FUTURE OCCURRENCE CODE PREDICTION

BACKGROUND

Various embodiments of the present invention address technical challenges related to performing predictive structural analysis and provide solutions to address the efficiency and reliability shortcomings of existing predictive structural analysis solutions.

BRIEF SUMMARY

In general, various embodiments of the present invention provide methods, apparatus, systems, computing devices, computing entities, and/or the like for performing predictive structural analysis. Certain embodiments of the present invention utilize systems, methods, and computer program products that perform predictive structural analysis using at least one of techniques using time bound code transition likelihood data objects, techniques using cross-code relationship values, techniques using augmented entity-code occurrence data objects, techniques using per-pathway text representations of inferred occurrence pathways of a set of individual historic code occurrences, techniques using polygenic risk score (PRS) and/or other genomic measures, and/or the like.

In accordance with one aspect, a method is provided. In one embodiment, the method comprises: identifying a plurality of time bound code transition likelihood data objects for an entity cluster that is associated with the identifiable data entity, wherein each time bound code transition likelihood data object is associated with a defined time bound of a plurality of defined time bounds, and the time bound code transition likelihood data object for a particular defined time bound describes, for each code pair comprising a first defined occurrence code of a plurality of defined occurrence codes and a second defined occurrence code of the plurality of defined occurrence codes, an inferred likelihood that the second defined occurrence code occurs within the particular defined time bound of an assumed occurrence of the first defined occurrence code; generating, based at least in part on the plurality of time bound code transition likelihood data objects and a set of individual historic code occurrences for the identifiable data entity, the future occurrence code prediction, wherein the future occurrence code prediction comprises a selected subset of the plurality of defined occurrence codes; and performing one or more prediction-based actions based at least in part on the future occurrence code prediction.

In accordance with another aspect, a computer program product is provided. The computer program product may comprise at least one computer-readable storage medium having computer-readable program code portions stored therein, the computer-readable program code portions comprising executable portions configured to: identify a plurality of time bound code transition likelihood data objects for an entity cluster that is associated with the identifiable data entity, wherein each time bound code transition likelihood data object is associated with a defined time bound of a plurality of defined time bounds, and the time bound code transition likelihood data object for a particular defined time bound describes, for each code pair comprising a first defined occurrence code of a plurality of defined occurrence codes and a second defined occurrence code of the plurality of defined occurrence codes, an inferred likelihood that the second defined occurrence code occurs within the particular defined time bound of an assumed occurrence of the first defined occurrence code; generate, based at least in part on the plurality of time bound code transition likelihood data objects and a set of individual historic code occurrences for the identifiable data entity, the future occurrence code prediction, wherein the future occurrence code prediction comprises a selected subset of the plurality of defined occurrence codes; and perform one or more prediction-based actions based at least in part on the future occurrence code prediction.

In accordance with yet another aspect, an apparatus comprising at least one processor and at least one memory including computer program code is provided. In one embodiment, the at least one memory and the computer program code may be configured to, with the processor, cause the apparatus to: for each table column: identify a plurality of time bound code transition likelihood data objects for an entity cluster that is associated with the identifiable data entity, wherein each time bound code transition likelihood data object is associated with a defined time bound of a plurality of defined time bounds, and the time bound code transition likelihood data object for a particular defined time bound describes, for each code pair comprising a first defined occurrence code of a plurality of defined occurrence codes and a second defined occurrence code of the plurality of defined occurrence codes, an inferred likelihood that the second defined occurrence code occurs within the particular defined time bound of an assumed occurrence of the first defined occurrence code; generate, based at least in part on the plurality of time bound code transition likelihood data objects and a set of individual historic code occurrences for the identifiable data entity, the future occurrence code prediction, wherein the future occurrence code prediction comprises a selected subset of the plurality of defined occurrence codes; and perform one or more prediction-based actions based at least in part on the future occurrence code prediction.

In some of the embodiments of the above aspects, generating the selected subset is performed based at least in part on: (i) a first subset of the plurality of defined occurrence codes that is determined based at least in part on the plurality of time bound code transition likelihood data objects, (ii) a second subset of the plurality of defined occurrence codes that is determined based at least in part on the one or more individual historic code occurrences for the identifiable data entity, (iii) a third subset of the plurality of defined occurrence codes that is determined based at least in part on each cross-code relationship value for a code pair, and (iv) a fourth subset of the plurality of defined occurrence codes that is determined based at least in part on external data sources other than the set of individual code occurrences for the identifiable data entity (e.g., based at least in part on one or more PRSs for an identifiable data entity that corresponds to a patient identifier).

BRIEF DESCRIPTION OF THE DRAWINGS

Figure 1:
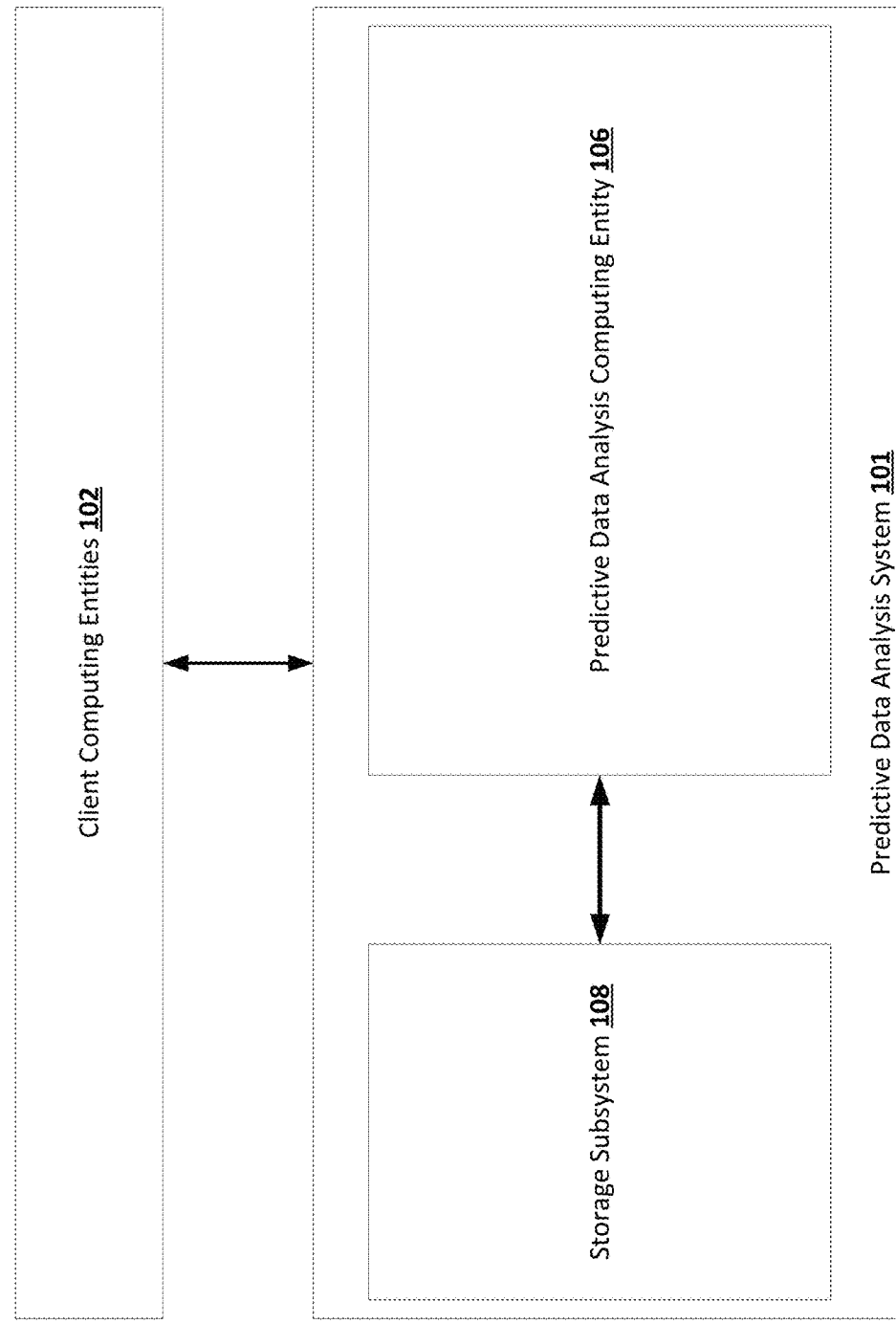

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
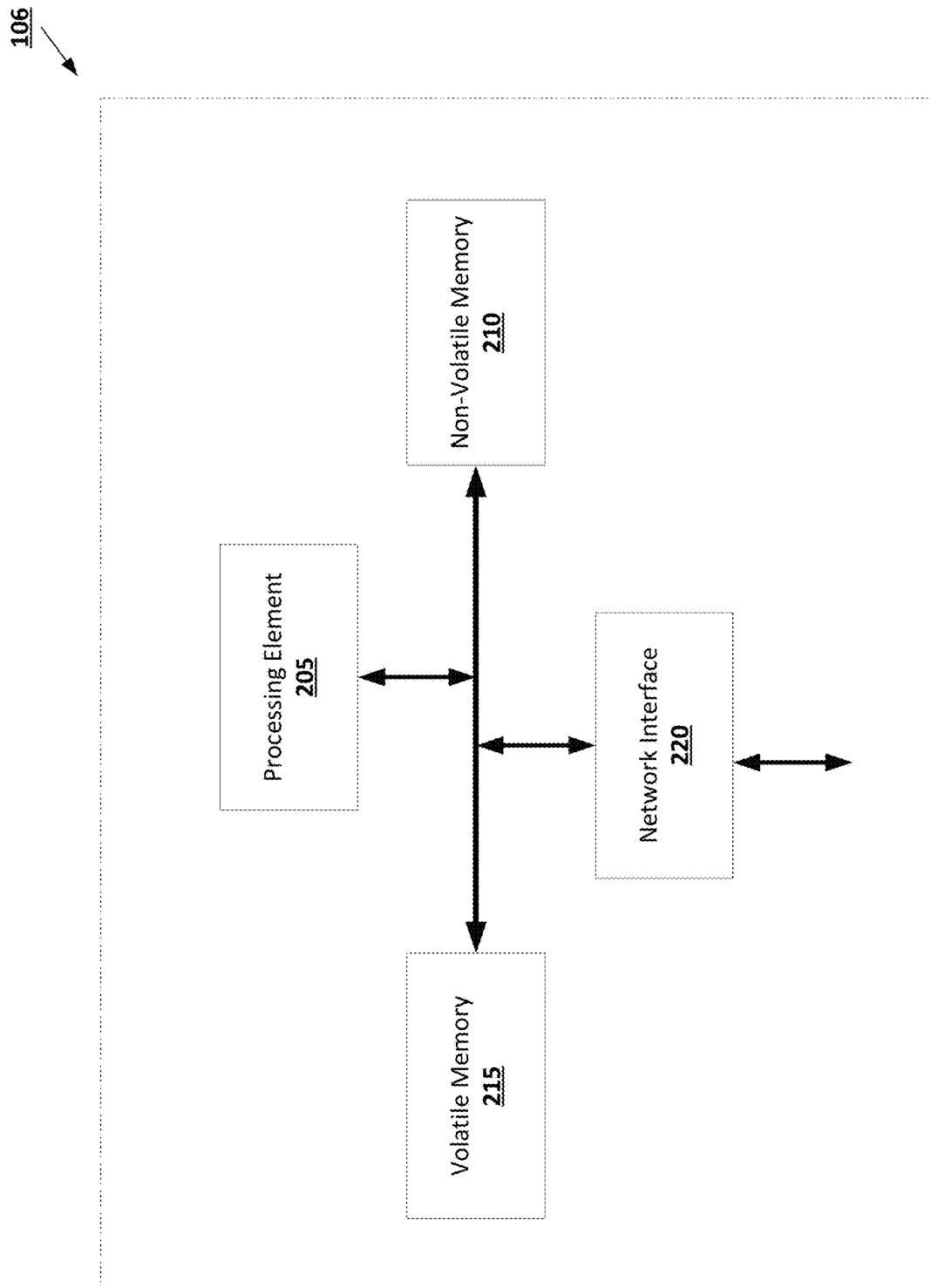

FIG. 2 provides an example predictive data analysis computing entity in accordance with some embodiments discussed herein.

Figure 3:
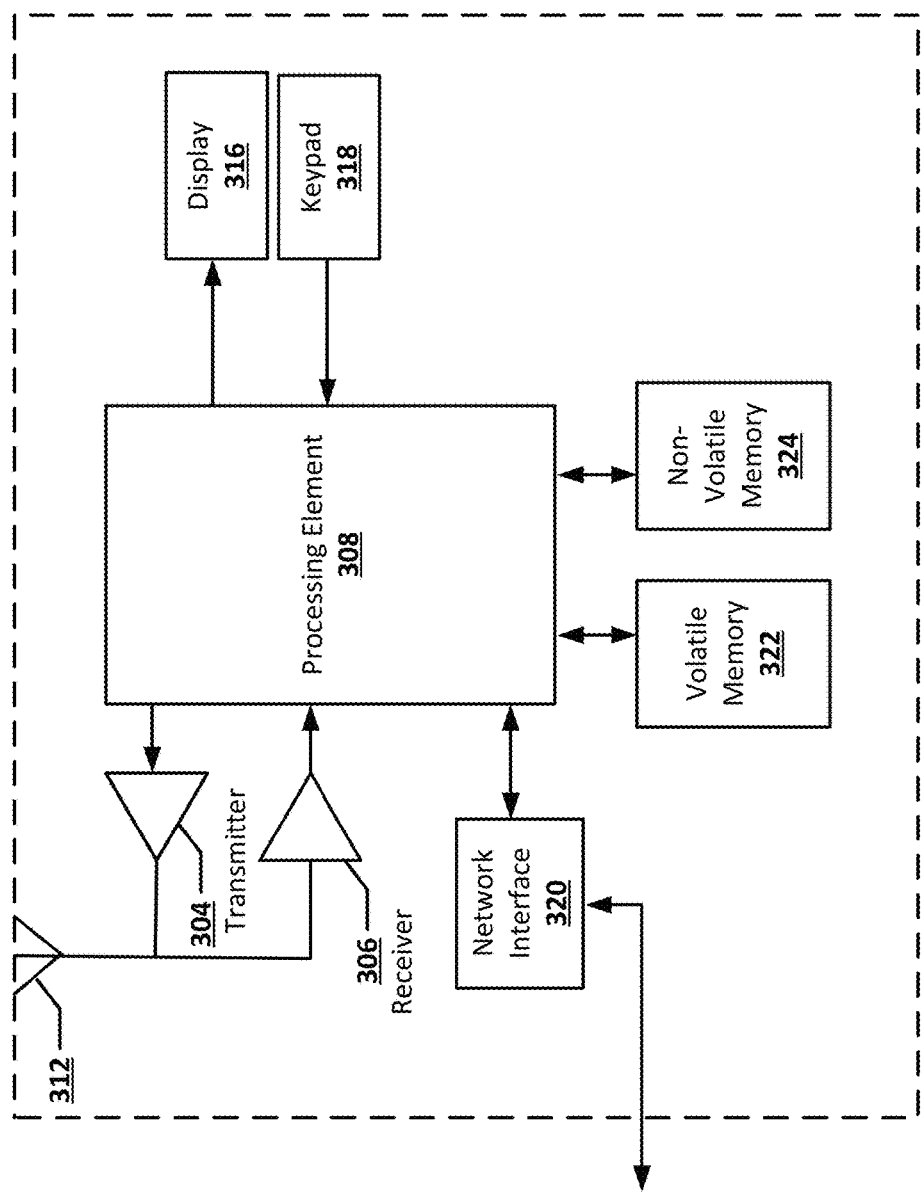

FIG. 3 provides an example client computing entity in accordance with some embodiments discussed herein.

Figure 4:
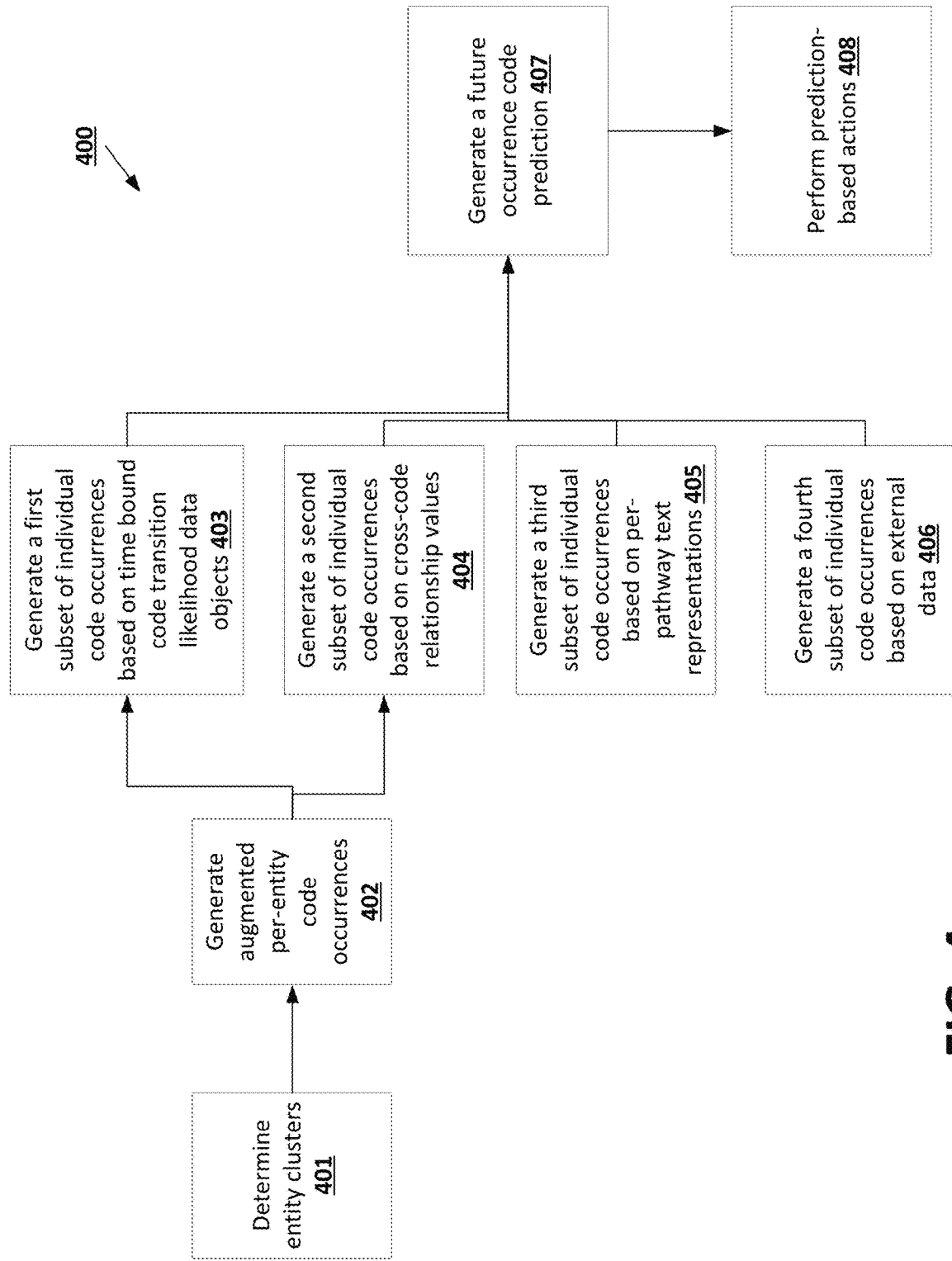

FIG. 4 is a flowchart diagram of an example process for generating a future occurrence code prediction for an identifiable data entity in accordance with some embodiments discussed herein.

Figure 5:
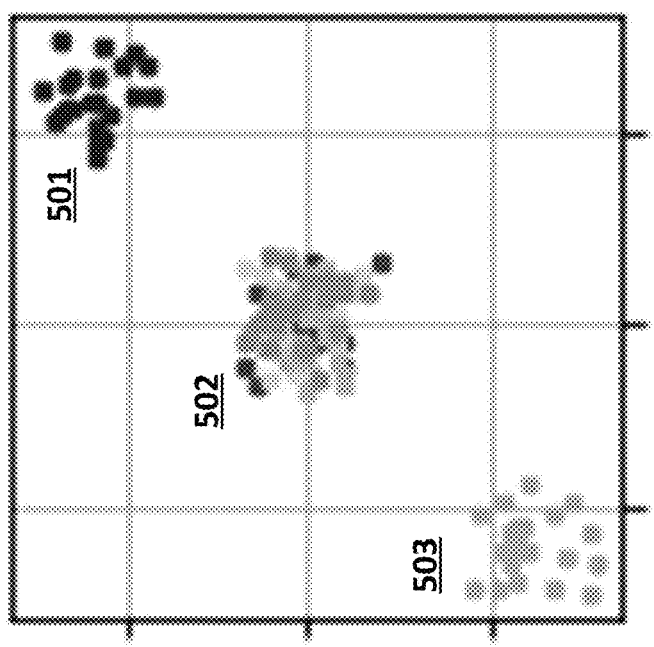

FIG. 5 provides an operational example of a set of entity clusters generated using a multi-dimensional space for mapping identifiable data entities in accordance with some embodiments discussed herein.

Figure 6:
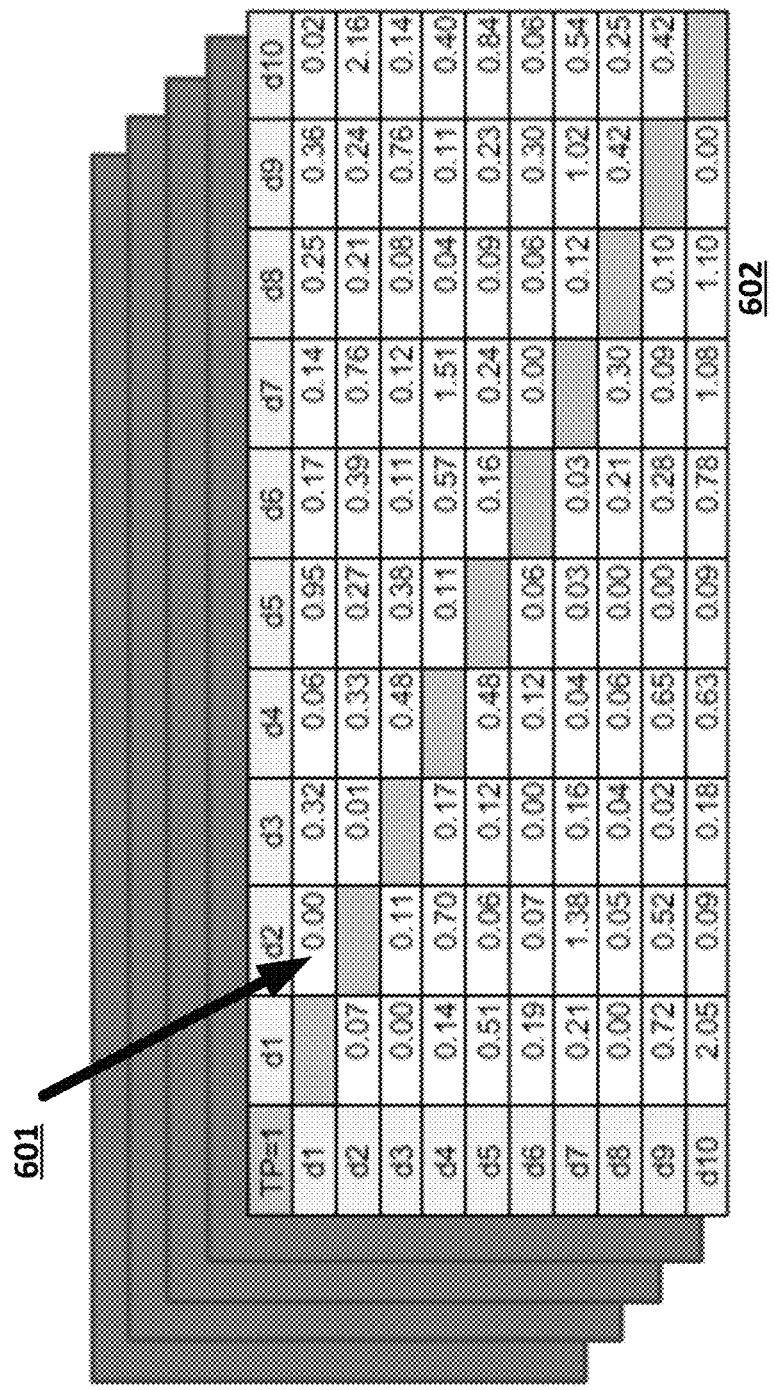

FIG. 6 provides an operational example of a time bound code transition likelihood data object in accordance with some embodiments discussed herein.

Figure 7:
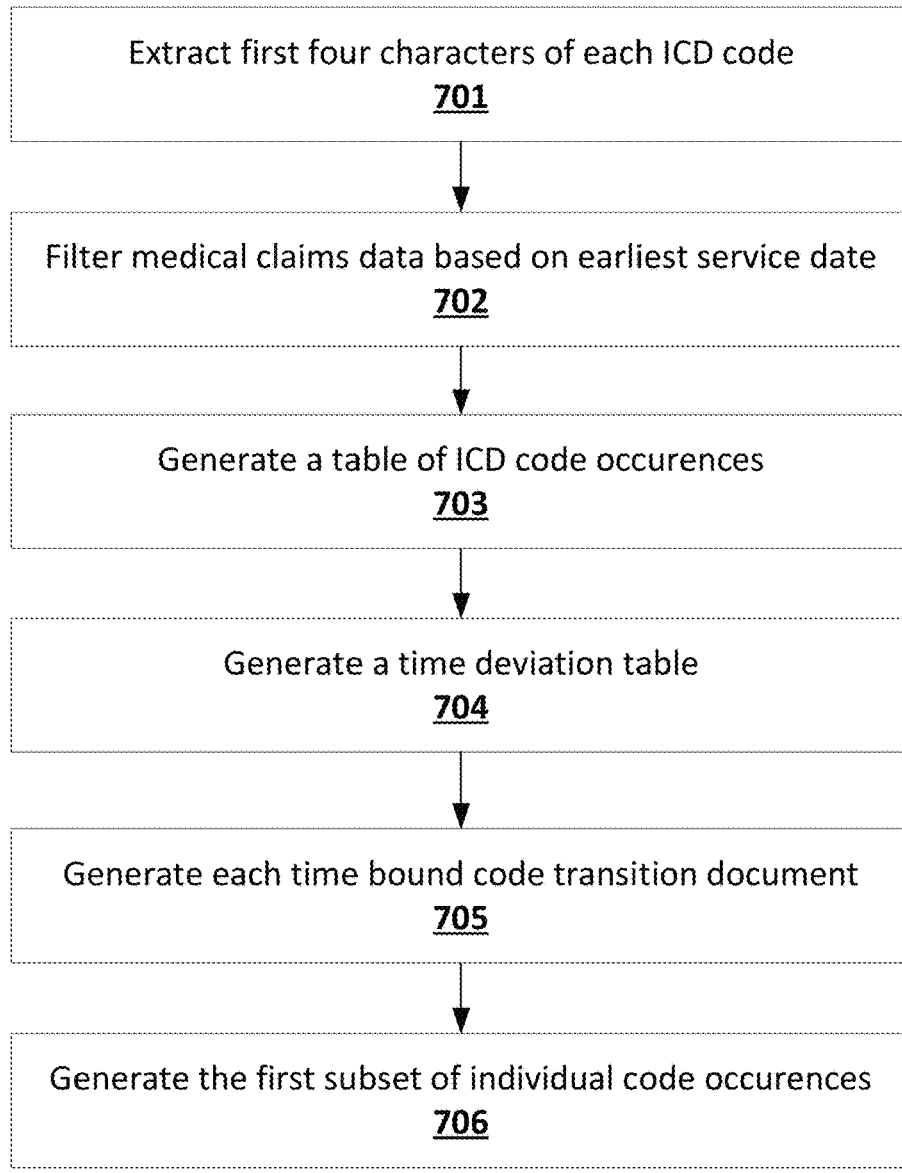

FIG. 7 is a flowchart diagram of an example process for generating a subset of related ICD codes based at least in part on inferred periodic code transition likelihoods for a set of defined time bounds corresponding to months of a year and based at least in part on International Classification of Diseases (ICD) code occurrence data in accordance with some embodiments discussed herein.

Figure 8:
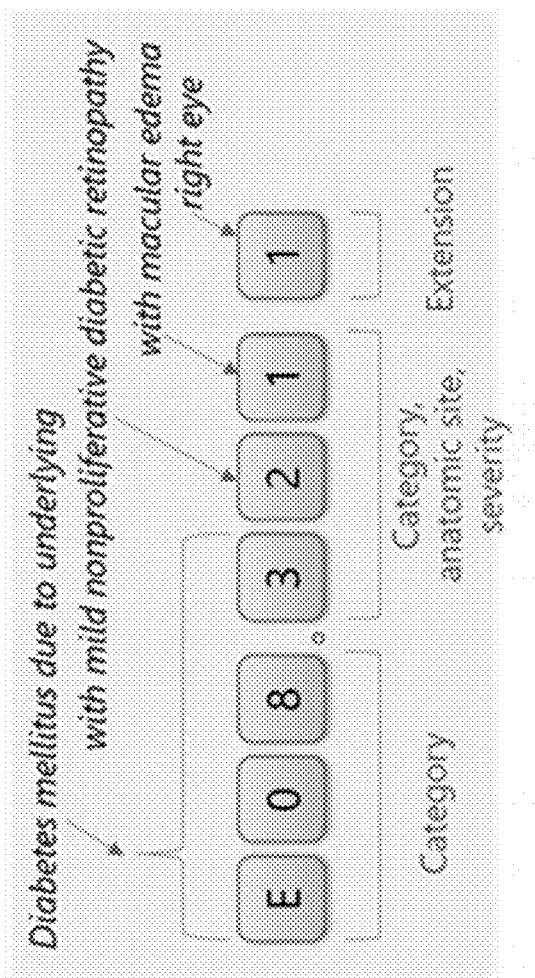

FIG. 8 provides an operational example of the structure of an ICD code in accordance with some embodiments discussed herein.

FIG. 9 provides an operational example of filtering medical claim data based at least in part on earliest service date in accordance with some embodiments discussed herein.

FIG. 10 provides an operational example of various ICD code occurrences that are generated based at least in part on filtered medical claim data in accordance with some embodiments discussed herein.

FIG. 11 provides an operational example of a time deviation table in accordance with some embodiments discussed herein.

Figure 12:
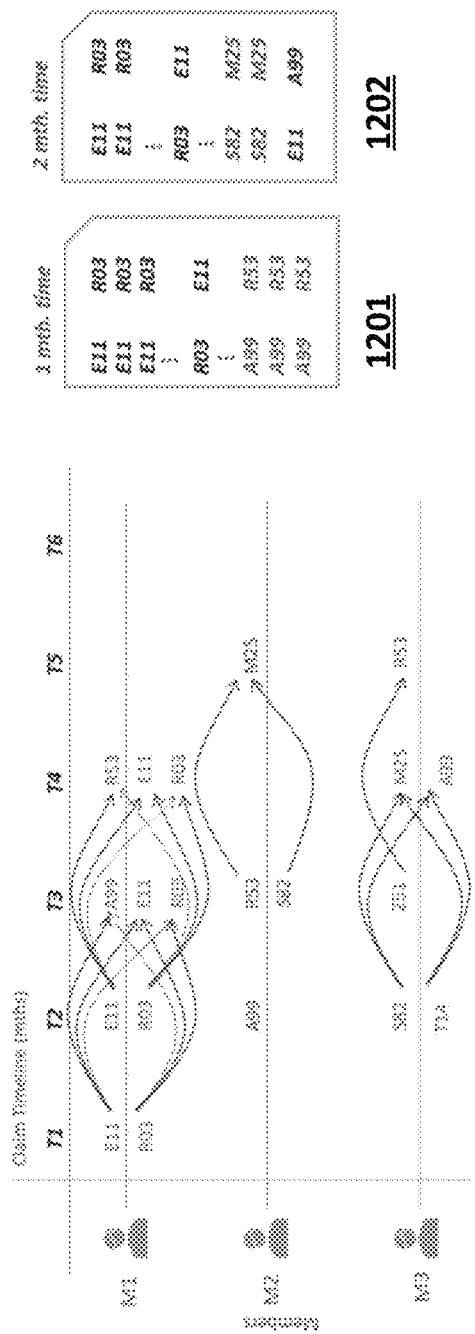

FIG. 12 provides an operational example of two time bound code transition documents in accordance with some embodiments discussed herein.

FIG. 13 provides an operational example of set of cross-code relationship values for a set of code pairs each comprising a pair of defined occurrence codes in accordance with some embodiments discussed herein.

Figure 14:
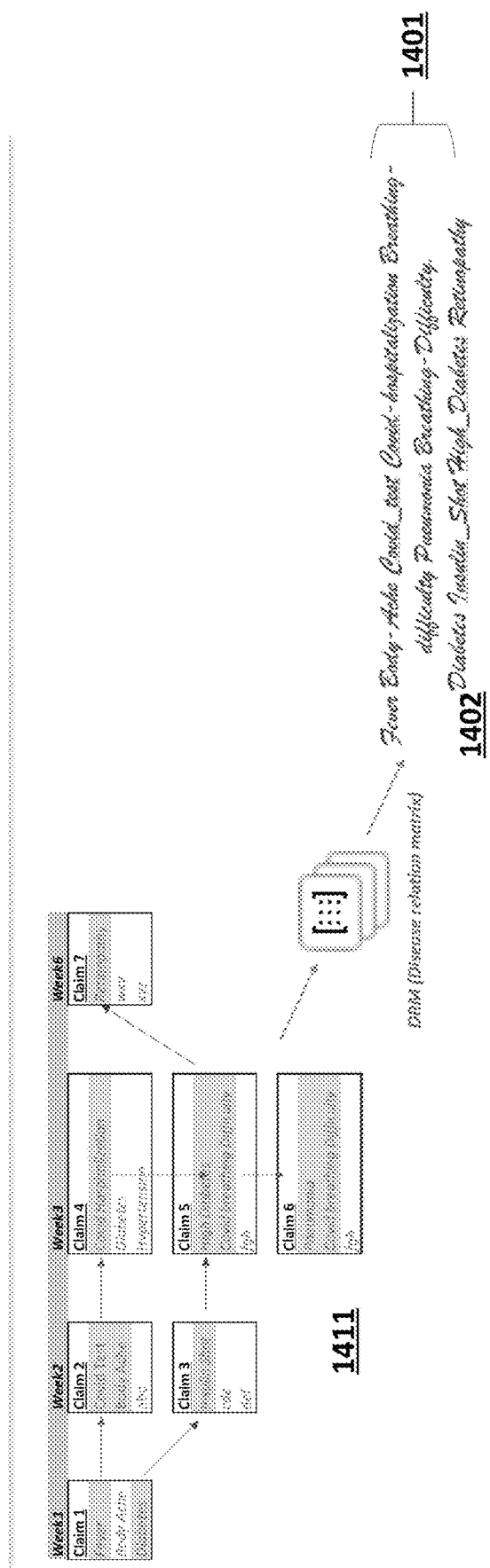

FIG. 14 provides an operational example of a sequence of per-pathway text representations for two inferred occurrence pathways in accordance with some embodiments discussed herein.

Figure 15:

FIG. 15 provides an operational example of a prediction output user interface depicting future occurrence code predictions for a patient identifiable data entity in accordance with some embodiments discussed herein.

DETAILED DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW AND TECHNICAL IMPROVEMENTS

Various embodiments of the present invention address technical challenges associated with improving the efficiency of predictive data analysis systems that are configured to perform predictive data analysis operations on coded data by providing techniques that utilize liner operations associated with time bound code transition likelihood data objects to perform the noted predictive data analysis solutions. By using time bound code transition likelihood data objects, various embodiments of the present invention reduce the computational complexity of real-time operations that are configured to predict future occurrence codes for identifiable data entities. This is because time bound code transition likelihood data objects contain valuable data that enable linear operations configured to utilize historical code occurrences for an identifiable data entity to predict future code occurrence expectations for the identifiable data entity.

For example, various embodiments of the present invention disclose future occurrence code prediction using a set of time bound code transition likelihood data objects each associated with a defined time bound, where each time bound code transition likelihood data object describes, for each code pair including a first defined occurrence code and a second defined occurrence, an inferred likelihood that the second defined occurrence code occurs within a corresponding defined time bound of an assumed occurrence of the first defined occurrence code. For example, consider a defined time bound of up to one month of deviation. In this example, a time bound code transition likelihood data object may describe, for each ICD code pair, an inferred likelihood that occurrence of a first ICD code within the health history of a patient identifiable data entity may lead to occurrence of a second ICD code within the health history of the patient identifiable data entity in a time span of less but up to one month (e.g., occurrence of the first ICD code on 1/1 will lead to occurrence of the second ICD code on 1/15). As another example, consider a defined time bound of more than one month of deviation but less than and up to two months deviation. In this example, a time bound code transition likelihood data object may describe, for each ICD code pair, an inferred likelihood that occurrence of a first ICD code within the health history of a patient identifiable data entity may lead to occurrence of a second ICD code within the health history of the patient identifiable data entity between one to two months of the occurrence of the first ICD code (e.g., occurrence of the first ICD code on 1/1 will lead to occurrence of the second ICD code on 2/15). As yet another example, consider a defined time bound of more than two months of deviation but less than and up to three months deviation. In this example, a time bound code transition likelihood data object may describe, for each ICD code pair, an inferred likelihood that occurrence of a first ICD code within the health history of a patient identifiable data entity may lead to occurrence of a second ICD code within the health history of the patient identifiable data entity between two to three months of the occurrence of the first ICD code (e.g., occurrence of the first ICD code on 1/1 will lead to occurrence of the second ICD code on 3/15).

By utilizing time bound code transition likelihood data objects each associated with a defined time bound to perform future occurrence code prediction, various embodiments of the present invention enable efficient real-time future occurrence code prediction in real-time. In some embodiments, the time bound code transition likelihood data objects can further be utilized to facilitate efficient and reliable future occurrence code prediction using language-based machine learning models, thus further improving efficiency and reliability of predictive data analysis systems that are configured to perform predictive data analysis operations on coded data.

An exemplary application of various embodiments of the present invention relates to predicting future ICD/diagnosis codes for a patient. Disease prediction plays an important role in medical and insurance fields. It has become important to discover hidden patterns and relationships from existing patient data. Diseases usually have a certain incubation and latency period after which they transition to other diseases/states. These patterns can be identified by creating a time-dependent prediction system. Broadly, diseases are classified into four categories: injuries, infectious diseases, lifestyle-related diseases, and chronic diseases. Various embodiments of the present invention enable performing disease prediction for a patient based at least in part on disease relation data for a patient cluster of the patient and disease co-occurrence association data for the patient cluster, where the disease relation data include a disease relation matrix for each defined time period, and each disease relation matrix value in the disease relation matrix for a particular time period describes the product of a term frequency of occurrence of transition between the two health conditions within the time period and the inverse frequency of occurrence transitions between the two health conditions across all time periods.

In some of the embodiments of the above aspects, generating the selected subset is performed based at least in part on: (i) a first subset of the plurality of defined occurrence codes that is determined based at least in part on the plurality of time bound code transition likelihood data objects, (ii) a second subset of the plurality of defined occurrence codes that is determined based at least in part on the one or more individual historic code occurrences for the identifiable data entity, (iii) a third subset of the plurality of defined occurrence codes that is determined based at least in part on each cross-code relationship value for a code pair, and (iv) a fourth subset of the plurality of defined occurrence codes that is determined based at least in part on external data sources other than the set of individual code occurrences for the identifiable data entity (e.g., based at least in part on one or more PRSs for an identifiable data entity that corresponds to a patient identifier).

II. DEFINITIONS

The term "defined occurrence code" may refer to a data entity that is configured to describe a code selected from a defined set of codes that may be used to categorize an occurred event. An example of a defined occurrence code is an ICD code that may be used to categorize a medical claim and/or a delivered medical service, a CPT code that may be used to categorize a medical claim and/or a performed medical procedure, a pharmacy code that may be used to categorize a pharmacy claim, and/or the like. In some embodiments, one objective of a proposed solution described herein is to process a set of historically-recorded defined occurrence codes (e.g., a set of historical-recorded ICD codes) for a patient identifiable data entity in order to infer one or more expected future defined occurrences (e.g., one or more expected future occurrence codes) for a patient identifiable data entity.

The term "identifiable data entity" may refer to a data entity that is configured to describe a real-world entity and/or a virtual entity with respect to which one or more predictive data analysis operations are performed. An example of an identifiable data entity may be a patient identifiable data entity, such as a data entity that describes one or more features associated with a patient such as one or more identifier information fields associated with the patient, one or more demographic information fields associated with the patient, one or more health history fields associated with the patient, and/or the like. In some embodiments, an identifiable data entity is associated with a set of individual historical code occurrences, wherein each individual historical code occurrence may describe that the corresponding identifiable data entity has an association with an event categorized by a corresponding defined occurrence code at a defined occurrence timestamp. For example, a particular individual historical occurrence code may describe that a corresponding patient identifiable data entity has been subject to a medical claim having a corresponding ICD code at a particular time. In this example, the ICD code may be the defined occurrence code for the particular individual historical occurrence code, while the particular time may be the occurrence timestamp for the particular individual historical occurrence code. In some embodiments, an identifiable data entity is associated with an entity cluster that comprises a set of clustered identifiable data entities (e.g., a set of clustered patient identifiable data entities) that are deemed to be similar and/or related to the particular identifiable data entity.

The term "entity cluster" may refer to data entity that is configured to describe a set of clustered identifiable data entities (e.g., a set of clustered patient identifiable data entities) that are deemed to be similar and/or related to the particular identifiable data entity. For example, an entity cluster may describe a set of patient identifiable data entities that are deemed to be similar and/or related based at least in part on a set of clustering features, wherein the noted set of clustering features may include at least one or more of the following: one or more clustering features determined based at least in part on lifecycle factors deemed related to disease occurrence and one or more social determinant features determined based at least in part on factors related to social determinants of health that are deemed related to disease occurrence. In some embodiments, determining a set of entity clusters comprises mapping a set of identifiable data entities (e.g., a set of patient identifiable data entities) to a multi-dimensional space characterized by the set of clustering features, and then applying a clustering routine to the multi-dimensional space in order to generate the noted set of entity clusters. An example of a clustering routine that may be used to generate entity clusters based at least in part on a multi-dimensional space with entity mappings as described is ROCK (Robust Clustering Algorithm for Categorical Attributes), which in at least some embodiments may overperform traditional clustering routines with respect to categorical data because (instead of using distance values between mappings as used in many traditional clustering routines) ROCK uses links and not distance values when generating entity clusters. In some embodiments, a proposed solution generates n entity clusters based at least in part on a set of identifiable data entities, where n may be a tuned hyper-parameter of a proposed system. An example value for n is seven, which in some of the experiments conducted by the inventors of the present application has shown superior performance.

The term "future occurrence code prediction" may refer to a data entity that is configured to describe a selected subset of a set of defined occurrence codes that are predicted to occur in the future in relation to a corresponding predictive entity (e.g., in relation to a corresponding patient identifiable data entity) based at least in part on a set of individual historic code occurrences for the corresponding identifiable data entity. In some embodiments, the selected subset of defined occurrence codes that are described by a future occurrence code prediction comprise at least one of the following subsets: (i) a first subset of defined occurrence codes that are determined based at least in part on determining occurrence codes that are deemed likely to occur within defined time bounds of individual historic code occurrences for the identifiable data entity in accordance with a plurality of time bound code transition likelihood data objects each associated with a defined time bound of a plurality of defined time bounds, (ii) a second subset of defined occurrence codes that are determined based at least in part on determining occurrence codes that are deemed related to occurrence codes described by individual historic code occurrences for the identifiable data entity in accordance with a set of cross-code relationship values for code pairs, (iii) a third subset of defined occurrence codes that are determined based at least in part on processing text-based representations of individual historic code occurrences for the identifiable data entity using aa language-based machine learning model, and (iv) a fourth subset of defined occurrence codes that are determined based at least in part on one or more genetic risk scores for an identifiable data entity that is a patient identifiable data entity (e.g., one or more PRS scores for a patient identifiable data entity). In some embodiments, a predictive data analysis computing entity generates the future occurrence code prediction based at least in part on the four subsets of defined occurrence codes described above. The future occurrence prediction may describe a selected subset of a set of defined occurrence codes that are predicted to occur in the future in relation to a corresponding predictive entity (e.g., in relation to a corresponding patient identifiable data entity) based at least in part on a set of individual historic code occurrences for the corresponding identifiable data entity. In some embodiments, a predictive data analysis computing entity generates the future occurrence code prediction by combining (e.g., performing a union operation across) on the four subsets of defined occurrence codes determined above. In some embodiments, a predictive data analysis computing entity generates the future occurrence code prediction by performing an intersection operation across the four subsets of defined occurrence codes determined above.

The term "time bound code transition likelihood data object" may refer to a data entity that is configured to describe, for each code pair including a first defined occurrence code and a second defined occurrence, an inferred likelihood that the second defined occurrence code occurs within a corresponding defined time bound of an assumed occurrence of the first defined occurrence code. For example, consider a defined time bound of up to one month of deviation. In this example, a time bound code transition likelihood data object may describe, for each ICD code pair, an inferred likelihood that occurrence of a first ICD code within the health history of a patient identifiable data entity may lead to occurrence of a second ICD code within the health history of the patient identifiable data entity in a time span of less but up to one month (e.g., occurrence of the first ICD code on 1/1 will lead to occurrence of the second ICD code on 1/15). As another example, consider a defined time bound of more than one month of deviation but less than and up to two months deviation. In this example, a time bound code transition likelihood data object may describe, for each ICD code pair, an inferred likelihood that occurrence of a first ICD code within the health history of a patient identifiable data entity may lead to occurrence of a second ICD code within the health history of the patient identifiable data entity between one to two months of the occurrence of the first ICD code (e.g., occurrence of the first ICD code on 1/1 will lead to occurrence of the second ICD code on 2/15). As yet another example, consider a defined time bound of more than two months of deviation but less than and up to three months deviation. In this example, a time bound code transition likelihood data object may describe, for each ICD code pair, an inferred likelihood that occurrence of a first ICD code within the health history of a patient identifiable data entity may lead to occurrence of a second ICD code within the health history of the patient identifiable data entity between two to three months of the occurrence of the first ICD code (e.g., occurrence of the first ICD code on 1/1 will lead to occurrence of the second ICD code on 3/15). In some embodiments, a time bound code transition likelihood data object is a matrix.

The term "per-entity code occurrence" may refer to a data entity that is configured to describe occurrence of an event categorized by a corresponding occurrence code in relation to a clustered identifiable data entity in an entity cluster and at a corresponding occurrence timestamp. For example, a per-entity code occurrence may describe that a particular patient identifiable data entity in a patient cluster is associated with a medical claim associated with a first ICD code that has an earliest service date of May 1, 2021. In some embodiments, given that each medical claim may be associated with one or more ICD codes, each medical claim may in turn be used to generate one or more per-entity code occurrences. In some embodiments, per-entity code occurrences are used to generate time bound code transition documents for defined time bounds, and the time bound code transition documents are then in turn used to generate time bound code transition likelihood data objects.

The term "entity-code occurrence data object" may refer to a data entity that is configured to describe co-occurrences between defined occurrence codes and clustered identifiable data entities in a corresponding entity cluster. For example, an entity-code occurrence data object may be a matrix (e.g., a sparse matrix) that describes, for each patient identifiable data entity in a patient cluster, the count of each medical code occurrence associated with the patient identifiable data entity that are associated with each defined occurrence code. In some embodiments, the entity-code occurrence data object may be a matrix, where one of the dimensions of matrix is associated with identifiable data entities, and the other dimension is associated with defined occurrence codes. In some of the noted embodiments, each value of the matrix may describe a count of occurrences of the corresponding defined occurrence code in data associated with the corresponding identifiable data entity.

The term "augmented entity-code occurrence data object" may refer to a data entity that is configured to describe an entity-code occurrence data object that is augmented by adding one or more inferred missing values. For example, the augmented entity-code occurrence data object may be generated by performing singular value decomposition on the entity-code occurrence data object in order to generate a set of lower-ranked entity-code occurrence data objects, determining one or more missing values in the entity-code occurrence data object based at least in part on the one or more target lower-ranked entity-code occurrence data objects, and generating the augmented entity-code occurrence data object based at least in part on the one or more missing values. As another example, the augmented entity-code occurrence data object may be generated by performing singular value decomposition on the entity-code occurrence data object in order to generate a set of lower-ranked entity-code occurrence data objects, generating a reconstructed entity-code occurrence data object based at least in part on the set of lower-ranked entity code relationship data objects, and generating the entity-code occurrence data object based at least in part on the reconstructed entity-code occurrence data object. In some embodiments, the augmented entity-code occurrence data object is generated using a set of Generalized Low Ranked Matrix Imputation operations that are performed on an entity-code occurrence data object. Aspects of the singular value decomposition operations discussed above are described in Krzanowski, *Missing Value Imputation in Multivariate Data using the Singular Value Decomposition of a Matrix* (1998).

The term "time bound code transition document" may refer to a data object that is configured to contain all code transitions comprising of two defined occurrence codes that occur within a defined time bound one after the other. For example, a time bound code transition document may describe each code pair that occur within a corresponding defined time bound. For example, a time bound code transition document may describe each code pair that occur in a corresponding defined time bound as determined based at least in part on a set of augmented per-entity code occurrences for an entity cluster that is determined by augmenting a set of per-entity code occurrences for the entity cluster in accordance with missing values described by an augmented entity-code occurrence data object. In some embodiments, each occurrence of a code pair within a time bound code transition document describes that a second defined occurrence code in the code pair has been recorded to occur once during the corresponding time bound code transition document. For example, occurrence of an ICD code pair within the time bound code transition document of a defined time bound associated with up to one months of deviation describes that, within one months of occurrence of the first ICD code in the ICD code pair, the second ICD code pair has been recorded to occur within particular source data (e.g., within a set of augmented per-entity code occurrences for an entity cluster that are determined by augmenting a set of per-entity code occurrences for the entity cluster in accordance with missing values described by an augmented entity-code occurrence data object).

The term "time bound code transition likelihood object" may refer to a data entity that is configured to describe, for a corresponding code pair comprising two defined occurrence codes, a measure that is determined based at least in part on a per-document occurrence of the code pair as described by the time bound code transition document for a corresponding defined time bound and a cross-document occurrence of the code pair as described by each time bound code transition document. In some embodiments, the time bound code transition likelihood objects for a set of code pairs are determined by applying a binary operation (e.g., a matrix multiplication operation, an element-wise matrix multiplication operation, and/or the like) on a term frequency matrix for the corresponding defined time bound and an inverse domain frequency matrix for the corresponding defined time bound. In the noted example, the term frequency matrix for the corresponding defined time bound may describe, for each code pair, the ratio of occurrences of the code pair in the time bound code transition document for the corresponding defined time bound to all of the occurrences of all code pairs in the time bound code transition document for the corresponding defined time bound. Moreover, the inverse domain frequency matrix for the corresponding defined time bound may describe, for each code pair, a measure that is determined based at least in part on a ratio of a count of all of the defined time bounds to a count of all of the defined time bounds whose corresponding time bound code transition documents describe the code pair at least once (e.g., a log of a ratio of a count of all of the defined time bounds to a count of all of the defined time bounds whose corresponding time bound code transition documents describe the code pair at least once). In some embodiments, the time bound code transition likelihood object is term-frequency-inverse-domain-frequency (TF-IDF) measure that is determined based at least in part on a per-document occurrence of the code pair as described by the time bound code transition document for the particular defined time bound and a cross-document occurrence of the code pair as described by each time bound code transition document.

The term "cross-code relationship value" may refer to a data entity that is configured to describe, for a corresponding code pair comprising two defined occurrence codes, a measure of association between the two defined occurrence codes that describes a measure of relative frequency of common occurrences of the two defined occurrence codes in relation to common events. For example, the cross-code relationship value for an ICD code pair may describe a measure of relative frequency of common occurrences of the ICD code pair with respect to members in a cluster, such that two ICD codes may have a higher cross-code relationship value if the two ICD codes have occurred more frequently for members within a cluster In some embodiments, the cross-code relationship values for a set of code pairs are determined based at least in part on applying an a priori set mining routine to a set of code occurrences recorded within particular source data (e.g., within a set of augmented per-entity code occurrences for an entity cluster that are determined by augmenting a set of per-entity code occurrences for the entity cluster in accordance with missing values described by an augmented entity-code occurrence data object).

The term "inferred occurrence pathway" may refer to a data entity that is configured to describe a subset of the set of historic code occurrences for an identifiable data entity (referred to herein the set of individual historic code occurrences for the identifiable data entity) that are deemed to be in order of their actual disease progression. For example, within a set of ICD code occurrences for a patient identifiable data entity, those occurrences that relate to skin conditions may form one inferred occurrence pathway, while those occurrences that relate to flu-related conditions may form another inferred occurrence pathway. In some embodiments, inferred occurrence pathways of historic code occurrences may be determined based at least in part on measures of associations between defined code occurrences, where the noted measures of associations may be determined based at least in part on at least one of time bound code transition likelihood data objects and cross-code relationship values (e.g., based at least in part on at least one of time bound code transition likelihood data objects and a cross-code relationship value matrix describing cross-code relationship values for a set of code pairs each comprising two defined occurrence codes).

The term "language-based machine learning model" may refer to a data entity that is configured to describe parameters, hyper-parameters, and/or defined operations of a machine learning model, where the machine learning model is configured to process text data in order to generate n next tokens in the text data, where n may for example be one. In some embodiments, the language-based machine learning model is configured to process a sequence of per-pathway text representations for one or more inferred occurrence pathways of the set of individual historic code occurrences of the identifiable data entity to generate n next tokens in the sequence, where the n next tokens may then be used to generate a set of defined occurrence groupings which may in turn be used to generate the future occurrence code prediction for the identifiable data entity. In some embodiments, the language-based machine learning model is a natural language processing (NLP) machine learning model. In some embodiments, the language-based machine learning model is trained using an encoder-decoder framework. An example of a language-based machine learning model that may be used in accordance with various embodiments of the present invention is a Bidirectional Encoder for Representational Transformer (BERT) model, such as a retrained BERT model that is trained based on clinical data. In some embodiments, the input to a language-based machine learning model comprises a set and/or a sequence of vectors each describing a token (e.g., with each token comprising the Word2Vec representation of a word). In some embodiments, the outputs of a language-based machine learning model comprise a set and/or a sequence of vectors each describing a predicted token (e.g., with each token comprising the Word2Vec representation of a predicted word).

III. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 is a schematic diagram of an example architecture 100 for performing predictive data analysis. The architecture 100 includes a predictive data analysis system 101 configured to receive predictive data analysis requests from client computing entities 102, process the predictive data analysis requests to generate predictions, provide the generated predictions to the client computing entities 102, and automatically perform prediction-based actions based at least in part on the generated predictions.

An example of a prediction-based action that can be performed using the predictive data analysis system 101 is a request for generating future ICD code occurrences corresponding to future diseases that a patient may expected to experience. Disease prediction plays an important role in medical and insurance fields. It has become important to discover hidden patterns and relationships from existing patient data. Diseases usually have a certain incubation and latency period after which they transition to other diseases/states. These patterns can be identified by creating a time-dependent prediction system. Broadly, diseases are classified into four categories: injuries, infectious diseases, lifestyle-related diseases, and chronic diseases.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate predictions corresponding to the predictive data analysis requests, provide the generated predictions to the client computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

Exemplary Client Computing Entity

FIG. 3 provides an illustrative schematic representative of an client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

FIG. 4 is a flowchart diagram of an example process 400 for generating a future occurrence code prediction for an identifiable data entity. While various embodiments of the present invention describe combining multiple techniques (e.g., techniques using time bound code transition likelihood data objects, techniques using cross-code relationship values, techniques using augmented entity-code occurrence data objects, techniques using per-pathway text representations of inferred occurrence pathways of a set of individual historic code occurrences, techniques using PRS measures, and/or the like) to generate a future occurrence code prediction for an identifiable data entity, a person of ordinary skill in the relevant technology will recognize that each of the disclosed techniques can be performed individually without using the other disclosed techniques. Moreover, while various embodiments of the present invention describe performing the noted multiple techniques using a singular computing entity, a person of ordinary skill in the relevant technology will recognize that each of the disclosed techniques can be performed by a separate computing entity. The process 400 will now be described with reference to the predictive data analysis computing entity 106 of the predictive data analysis system 101, as described above in relation to FIG. 1.

The process 400 begins at step/operation 401 when the predictive data analysis computing entity 106 determines a set of entity clusters. In some embodiments, the predictive data analysis computing entity 106 determines a set of patient clusters based at least in part on at least one of the following: one or more clustering features determined based at least in part on lifecycle factors deemed related to disease occurrence and one or more social determinant features determined based at least in part on factors related to social determinants of health that are deemed related to the noted disease occurrence.

In some embodiments, an entity cluster comprises a set of clustered identifiable data entities (e.g., a set of clustered patient identifiable data entities) that are deemed to be similar and/or related to the particular identifiable data entity. For example, an entity cluster may describe a set of patient identifiable data entities that are deemed to be similar and/or related based at least in part on a set of clustering features, wherein the noted set of clustering features may include at least one or more of the following: one or more clustering features determined based at least in part on lifecycle factors deemed related to disease occurrence and one or more social determinant features determined based at least in part on factors related to social determinants of health that are deemed related to disease occurrence. In some embodiments, determining a set of entity clusters comprises mapping a set of identifiable data entities (e.g., a set of patient identifiable data entities) to a multi-dimensional space characterized by the set of clustering features, and then applying a clustering routine to the multi-dimensional space in order to generate the noted set of entity clusters. An example of a clustering routine that may be used to generate entity clusters based at least in part on a multi-dimensional space with entity mappings as described is ROCK (Robust Clustering Algorithm for Categorical Attributes), which in at least some embodiments may overperform traditional clustering routines with respect to categorical data because (instead of using distance values between mappings as used in many traditional clustering routines) ROCK uses links and not distance values when generating entity clusters. In some embodiments, a proposed solution generates n entity clusters based at least in part on a set of identifiable data entities, where n may be a tuned hyper-parameter of the predictive data analysis system 101. An example value for n is seven, which in some of the experiments conducted by the inventors of the present application has shown superior performance.

In some embodiments, each identifiable data entity in an entity cluster corresponds to a real-world entity and/or a virtual entity with respect to which one or more predictive data analysis operations are performed. An example of an identifiable data entity may be a patient identifiable data entity, such as a data entity that describes one or more features associated with a patient such as one or more identifier information fields associated with the patient, one or more demographic information fields associated with the patient, one or more health history fields associated with the patient, and/or the like. In some embodiments, an identifiable data entity is associated with a set of individual historical code occurrences, wherein each individual historical code occurrence may describe that the corresponding identifiable data entity has an association with an event categorized by a corresponding defined occurrence code at a defined occurrence timestamp. For example, a particular individual historical occurrence code may describe that a corresponding patient identifiable data entity has been subject to a medical claim having a corresponding ICD code at a particular time. In this example, the ICD code may be the defined occurrence code for the particular individual historical occurrence code, while the particular time may be the occurrence timestamp for the particular individual historical occurrence code. In some embodiments, an identifiable data entity is associated with an entity cluster that comprises a set of clustered identifiable data entities (e.g., a set of clustered patient identifiable data entities) that are deemed to be similar and/or related to the particular identifiable data entity.

An operational example of a set of entity clusters 501-503 is depicted in FIG. 5. As depicted in FIG. 5, each entity cluster includes a set of identifiable data entities (e.g., a set of patient identifiable data entities). As further depicted in FIG. 5, the entity clusters are determined using a depicted four-dimensional space to which the clustered identifiable data entities are mapped.

Returning to FIG. 4, at step/operation 402, the predictive data analysis computing entity 106 generates a set of augmented per-entity code occurrences for an entity cluster that includes the identifiable data entity. In some embodiments, the set of augmented per-entity code occurrences are determined based at least in part on an augmented entity-code occurrence data object, which is in turn may be generated by adding missing values to an entity-relationship data object.

In some embodiments, an entity-code occurrence data object describes co-occurrences between defined occurrence codes and clustered identifiable data entities in a corresponding entity cluster. For example, an entity-code occurrence data object may be a matrix (e.g., a sparse matrix) that describes, for each patient identifiable data entity in a patient cluster, the count of occurrences of every medical claim associated with the patient identifiable data entity that are associated with each defined occurrence code. In some embodiments, the entity-code occurrence data object may be a matrix, where one of the dimensions of matrix is associated with identifiable data entities, and the other dimension is associated with defined occurrence codes. In some of the noted embodiments, each value of the matrix may describe a count of occurrences of the corresponding defined occurrence code in data associated with the corresponding identifiable data entity. In some embodiments, an augmented entity-code occurrence data object is determined based at least in part on an entity-code occurrence data object that is augmented by adding one or more inferred missing values. For example, the augmented entity-code occurrence data object may be generated by performing singular value decomposition on the entity-code occurrence data object in order to generate a set of lower-ranked entity-code occurrence data objects, determining one or more missing values in the entity-code occurrence data object based at least in part on the one or more target lower-ranked entity-code occurrence data objects, and generating the augmented entity-code occurrence data object based at least in part on the one or more missing values. As another example, the augmented entity-code occurrence data object may be generated by performing singular value decomposition on the entity-code occurrence data object in order to generate a set of lower-ranked entity-code occurrence data objects, generating a reconstructed entity-code occurrence data object based at least in part on the set of lower-ranked entity code relationship data objects, and generating the entity-code occurrence data object based at least in part on the reconstructed entity-code occurrence data object. In some embodiments, the augmented entity-code occurrence data object is generated using a set of Generalized Low Ranked Matrix Imputation operations that are performed on an entity-code occurrence data object.

At step/operation 403, the predictive data analysis computing entity 106 determines a first subset of individual code occurrences for the identifiable data entity based at least in part on a set of time bound code transition likelihood data objects. In some embodiments, a selected subset of defined occurrence codes that are described by a future occurrence code prediction comprise at least one of the following subsets: (i) a first subset of defined occurrence codes that are determined based at least in part on determining occurrence codes that are deemed likely to occur within defined time bounds of individual historic code occurrences for the identifiable data entity in accordance with a plurality of time bound code transition likelihood data objects each associated with a defined time bound of a plurality of defined time bounds, (ii) a second subset of defined occurrence codes that are determined based at least in part on determining occurrence codes that are deemed related to occurrence codes described by individual historic code occurrences for the identifiable data entity in accordance with a set of cross-code relationship values for code pairs, (iii) a third subset of defined occurrence codes that are determined based at least in part on processing text-based representations of individual historic code occurrences for the identifiable data entity using aa language-based machine learning model, and (iv) a fourth subset of defined occurrence codes that are determined based at least in part on one or more genetic risk scores for an identifiable data entity that is a patient identifiable data entity (e.g., one or more PRS scores for a patient identifiable data entity).

In some embodiments, a time bound code transition likelihood data object describes, for each code pair including a first defined occurrence code and a second defined occurrence, an inferred likelihood that the second defined occurrence code occurs within a corresponding defined time bound of an assumed occurrence of the first defined occurrence code. For example, consider a defined time bound of up to one month of deviation. In this example, a time bound code transition likelihood data object may describe, for each ICD code pair, an inferred likelihood that occurrence of a first ICD code within the health history of a patient identifiable data entity may lead to occurrence of a second ICD code within the health history of the patient identifiable data entity in a time span of less but up to one month (e.g., occurrence of the first ICD code on 1/1 will lead to occurrence of the second ICD code on 1/15). As another example, consider a defined time bound of more than one month of deviation but less than and up to two months deviation. In this example, a time bound code transition likelihood data object may describe, for each ICD code pair, an inferred likelihood that occurrence of a first ICD code within the health history of a patient identifiable data entity may lead to occurrence of a second ICD code within the health history of the patient identifiable data entity between one to two months of the occurrence of the first ICD code (e.g., occurrence of the first ICD code on 1/1 will lead to occurrence of the second ICD code on 2/15). As yet another example, consider a defined time bound of more than two months of deviation but less than and up to three months deviation. In this example, a time bound code transition likelihood data object may describe, for each ICD code pair, an inferred likelihood that occurrence of a first ICD code within the health history of a patient identifiable data entity may lead to occurrence of a second ICD code within the health history of the patient identifiable data entity between two to three months of the occurrence of the first ICD code (e.g., occurrence of the first ICD code on 1/1 will lead to occurrence of the second ICD code on 3/15). In some embodiments, a time bound code transition likelihood data object is a matrix.

An operational example of a time bound code transition likelihood data object for a defined time bound of more than one month but less than two months (i.e., TP=1) is depicted in FIG. 6. As depicted in FIG. 6, each value of the time bound code transition likelihood data object describes an inferred likelihood that occurrence of a first defined occurrence code (that is associated with the vertical dimension of the time bound code transition likelihood data object) leads to occurrence of a second defined occurrence code (that is associated with the horizontal dimension of the time bound code transition likelihood data object) within a period of more than one month but less than two months of the occurrence of defined occurrence code. For example, matrix value 601 describes that there is no recorded likelihood that occurrence of defined occurrence code d1 will lead to occurrence of defined code d2 within a period of more than one month but less than two months of the occurrence of the defined occurrence code d1. As another example, matrix value 602 describes that there is a 1.1 recorded likelihood that occurrence of defined occurrence code d10 will lead to occurrence of defined code d2 within a period of more than one month but less than two months of the occurrence of the defined occurrence code d8.

In some embodiments, step/operation 402 may be performed in accordance with the process that is depicted in FIG. 7, which is an example process for generating a subset of related ICD codes based at least in part on inferred periodic code transition likelihoods for a set of defined time bounds corresponding to months of a year and based at least in part on ICD code occurrence data. The process 700 begins at step/operation 701 when the predictive data analysis computing entity 106 extracts the first four characters of each ICD code associated with an ICD code occurrence in the set of augmented per-entity code occurrences for a target patient cluster. As depicted in FIG. 8, the first four characters of an ICD code describe key disease information of the ICD code.

At step/operation 702, the predictive data analysis computing entity 106 filters out medical claim data for a year based at least in part on the earliest service date. For example, as depicted in FIG. 9, the predictive data analysis computing entity 106 has filtered out medical claims for one year based at least in part on erly_srvc_dt.

At step/operation 703, the predictive data analysis computing entity 106 generates a table of ICD code occurrences based at least in part on the filtered medical claim data. In some embodiments, each ICD code occurrence describes that a medical claim associated with a particular earliest service date is associated with a particular IDC code. FIG. 10 depicts an operational example of various ICD code occurrences that are generated based at least in part on the filtered medical claim data of FIG. 9.

At step/operation 704, the predictive data analysis computing entity 106 generates a time deviation table based at least in part on the table ICD code occurrences. In some embodiments, the predictive data analysis computing entity 106 performs a self-join operation on the table of ICD code occurrences based at least in part on a member identifier (i.e., a patient identifier), where the self-join excludes fields where ICD codes are the same, and then generates the defined time bound for each field of the table that is generated using the self-join operation. For example, as depicted in FIG. 11, each field of the depicted defined time bound is associated with an ICD code pair comprising a first ICD code 1101 and a second ICD code 1102, as well as a defined time bound 1103 for the corresponding ICD code pair.

At step/operation 705, the predictive data analysis computing entity 106 generates a time bound code transition document for each defined time bound that describes each ICD code pair in the time deviation table that is associated with the defined time bound based at least in part on the table ICD code occurrences. In general, a time bound code transition document may describe each code pair comprising two defined occurrence codes that occurs in a set of code occurrences in a corresponding defined time bound. For example, a time bound code transition document may describe each code pair that occur in a corresponding defined time bound as determined based at least in part on a set of augmented per-entity code occurrences for an entity cluster that is determined by augmenting a set of per-entity code occurrences for the entity cluster in accordance with missing values described by an augmented entity-code occurrence data object. In some embodiments, each occurrence of a code pair within a time bound code transition document describes that a second defined occurrence code in the code pair has been recorded to occur once during the corresponding time bound code transition document. For example, occurrence of an ICD code pair within the time bound code transition document of a defined time bound associated with up to one months of deviation describes that, within one months of occurrence of the first ICD code in the ICD code pair, the second ICD code pair has been recorded to occur within particular source data (e.g., within a set of augmented per-entity code occurrences for an entity cluster that are determined by augmenting a set of per-entity code occurrences for the entity cluster in accordance with missing values described by an augmented entity-code occurrence data object).

An operational example of two time bound code transition documents 1201-1202 are depicted in FIG. 12. As depicted in FIG. 12, each time bound code transition document is associated with a defined time bound and includes each code pair that occurs within the source data in association with the corresponding defined time bound. For example, because the source data describes that ICD code R03 occurs three times within one month of occurrence of the ICD code E11, the ordered{E11, R03} ICD code pair appears three times in the time bound code transition document 1201. As another example, because the source data describes that ICD code R03 occurs twice between one to two months of occurrence of the ICD code E11, the ordered {E11, R03} pair appears twice in the time bound code transition document 1202. In some embodiments, a code pair is an ordered pair of defined occurrence codes (e.g., an ordered pair of ICD codes).

At step/operation 705, the predictive data analysis computing entity 106 generates each time bound code transition likelihood data object based at least in part on the time bound code transition documents. In some embodiments, the time bound code transition likelihood data object describes the time bound code transition likelihood object for each code pair in relation to a corresponding defined time bound that is associated with the time bound code transition likelihood data object.

In some embodiments, the predictive data analysis computing entity 106 generates a time bound code transition likelihood object for each code pair in relation to a defined time bound, and the time bound code transition likelihood data object for the defined time bound describes each time bound code transition likelihood object that is associated with the defined time bound. In some embodiments, a time bound code transition likelihood object describes describe, for a corresponding code pair comprising two defined occurrence codes, a measure that is determined based at least in part on a per-document occurrence of the code pair as described by the time bound code transition document for a corresponding defined time bound and a cross-document occurrence of the code pair as described by each time bound code transition document.

In some embodiments, the time bound code transition likelihood objects for a set of code pairs are determined by applying a binary operation (e.g., a matrix multiplication operation, an element-wise matrix multiplication operation, and/or the like) on a term frequency matrix for the corresponding defined time bound and an inverse domain frequency matrix for the corresponding defined time bound. In the noted example, the term frequency matrix for the corresponding defined time bound may describe, for each code pair, the ratio of occurrences of the code pair in the time bound code transition document for the corresponding defined time bound to all of the occurrences of all code pairs in the time bound code transition document for the corresponding defined time bound. Moreover, the inverse domain frequency matrix for the corresponding defined time bound may describe, for each code pair, a measure that is determined based at least in part on a ratio of a count of all of the defined time bounds to a count of all of the defined time bounds whose corresponding time bound code transition documents describe the code pair at least once (e.g., a log of a ratio of a count of all of the defined time bounds to a count of all of the defined time bounds whose corresponding time bound code transition documents describe the code pair at least once). In some embodiments, the time bound code transition likelihood object is term-frequency-inverse-domain-frequency (TF-IDF) measure that is determined based at least in part on a per-document occurrence of the code pair as described by the time bound code transition document for the particular defined time bound and a cross-document occurrence of the code pair as described by each time bound code transition document.

At step/operation 706, the predictive data analysis computing entity 106 generates the first subset individual code occurrences for the identifiable data entity based at least in part on the set of time bound code transition likelihood data objects. As described above, in some embodiments, a selected subset of defined occurrence codes that are described by a future occurrence code prediction comprises a first subset of defined occurrence codes that are determined based at least in part on determining occurrence codes that are deemed likely to occur within defined time bounds of individual historic code occurrences for the identifiable data entity in accordance with a plurality of time bound code transition likelihood data objects each associated with a defined time bound of a plurality of defined time bounds.

In some embodiments, the predictive data analysis computing entity 106 may determine that, given the historic occurrence of a first defined occurrence code, a second defined occurrence code should be in the first subset if the code pair corresponding to the first defined occurrence code and the second defined occurrence code has a threshold-satisfying time bound code transition likelihood object in at least one time bound code transition likelihood data object that is associated with the entity cluster for the corresponding identifiable data entity. For example, if it is known that a patient identifiable data entity has in the past experienced a condition corresponding to a first ICD code, then a second ICD code should be included in the first subset if at least one time bound code transition likelihood data object that is associated with the entity cluster for the patient identifiable data entity describes that the ICD code pair comprising the first ICD code and the second ICD code has a threshold-satisfying time bound code transition likelihood object.

In some embodiments, the predictive data analysis computing entity 106 may determine that, given the historic occurrence of a first defined occurrence code, a second defined occurrence code should be in the first subset if the code pair corresponding to the first defined occurrence code and the second defined occurrence code has a threshold-satisfying time bound code transition likelihood object in at least n time bound code transition likelihood data objects that are associated with the entity cluster for the corresponding identifiable data entity. For example, if it is known that a patient identifiable data entity has in the past experienced a condition corresponding to a first ICD code, then a second ICD code should be included in the first subset if at least n time bound code transition likelihood data objects that are associated with the entity cluster for the patient identifiable data entity describes that the ICD code pair comprising the first ICD code and the second ICD code has a threshold-satisfying time bound code transition likelihood object. In some embodiments, n is defined by a tuned hyper-parameter of the predictive data analysis system 101.

Thus, as described above, various embodiments of the present invention address technical challenges associated with improving the efficiency of predictive data analysis systems that are configured to perform predictive data analysis operations on coded data by providing techniques that utilize liner operations associated with time bound code transition likelihood data objects to perform the noted predictive data analysis solutions. By using time bound code transition likelihood data objects, various embodiments of the present invention reduce the computational complexity of real-time operations that are configured to predict future occurrence codes for identifiable data entities. This is because time bound code transition likelihood data objects contain valuable data that enable linear operations configured to utilize historical code occurrences for an identifiable data entity to predict future code occurrence expectations for the noted identifiable data entity.

Returning to FIG. 4, at step/operation 404, the predictive data analysis computing entity 106 generates a second subset of individual code occurrences for the identifiable data entity based at least in part on each cross-code relationship value for a code pair comprising a pair of defined code-occurrences. As described above, in some embodiments, a selected subset of defined occurrence codes that are described by a future occurrence code prediction comprise at least one of the following subsets: (i) a first subset of defined occurrence codes that are determined based at least in part on determining occurrence codes that are deemed likely to occur within defined time bounds of individual historic code occurrences for the identifiable data entity in accordance with a plurality of time bound code transition likelihood data objects each associated with a defined time bound of a plurality of defined time bounds, (ii) a second subset of defined occurrence codes that are determined based at least in part on determining occurrence codes that are deemed related to occurrence codes described by individual historic code occurrences for the identifiable data entity in accordance with a set of cross-code relationship values for code pairs, (iii) a third subset of defined occurrence codes that are determined based at least in part on processing text-based representations of individual historic code occurrences for the identifiable data entity using aa language-based machine learning model, and (iv) a fourth subset of defined occurrence codes that are determined based at least in part on one or more genetic risk scores for an identifiable data entity that is a patient identifiable data entity (e.g., one or more PRS scores for a patient identifiable data entity).

In some embodiments, a cross-code relationship value describes, for a corresponding code pair comprising two defined occurrence codes, a measure of association between the two defined occurrence codes that describes a measure of relative frequency of common occurrences of the two defined occurrence codes in relation to common events. For example, the cross-code relationship value for an ICD code pair may describe a measure of relative frequency of common occurrences of the ICD code pair in relation to common medical claims, such that two ICD codes may have a higher cross-code relationship value if the two ICD codes have occurred more frequently within a historical set of common medical claims (e.g., within a set of augmented per-entity code occurrences for an entity cluster that are determined by augmenting a set of per-entity code occurrences for the entity cluster in accordance with missing values described by an augmented entity-code occurrence data object). In some embodiments, the cross-code relationship values for a set of code pairs are determined based at least in part on applying an a priori set mining routine to a set of code occurrences recorded within particular source data (e.g., within a set of augmented per-entity code occurrences for an entity cluster that are determined by augmenting a set of per-entity code occurrences for the entity cluster in accordance with missing values described by an augmented entity-code occurrence data object).

In some embodiments, a cross-code relationship value is associated with a defined occurrence code, which may be a code that is selected from a defined set of codes that may be used to categorize an occurred event. An example of a defined occurrence code is an ICD code that may be used to categorize a medical claim and/or a delivered medical service, a CPT code that may be used to categorize a medical claim and/or a performed medical procedure, a pharmacy code that may be used to categorize a pharmacy claim, and/or the like. In some embodiments, one objective of a proposed solution described herein is to process a set of historically-recorded defined occurrence codes (e.g., a set of historical-recorded ICD codes) for a patient identifiable data entity in order to infer one or more expected future defined occurrences (e.g., one or more expected future occurrence codes) for a particular patient identifiable data entity.

In some embodiments, given the historic occurrence of a first defined occurrence code, the predictive data analysis computing entity 106 selects a second defined occurrence code to be in the second subset described above if the cross-code relationship value for the code pair comprising the two defined occurrence codes satisfies a cross-code relationship value threshold. For example, given the historic occurrence of a first ICD code, the predictive data analysis computing entity 106 may select a second ICD code to be in the second subset described above if the cross-code relationship value for the ICD code pair comprising the two ICD codes satisfies a cross-code relationship value threshold. In some embodiments, the noted cross-code relationship value threshold is defined by at least one tuned hyper-parameter of the predictive data analysis system 101.

An operational example of a set of cross-code relationship values is depicted in FIG. 13. As depicted in FIG. 13, each cross-code relationship value is associated with two defined occurrence codes. For example, as depicted in FIG. 13, the code pair including the defined occurrence code for disorders of lipid metabolism as the first defined occurrence code and essential hypertension as the second defined occurrence code is associated with the cross-code relationship value of 0.53. As another example, as depicted in FIG. 13, the code pair including the defined occurrence code for essential hypertension as the first defined occurrence code and disorders of lipid metabolism as the second defined occurrence code is associated with the cross-code relationship value of 0.36.

Returning to FIG. 4, at step/operation 405, the predictive data analysis computing entity 106 generates a third subset of individual code occurrences for the identifiable data entity based at least in part on processing a sequence of per-pathway text representations for one or more inferred occurrence pathways of the set of individual historic code occurrences of the identifiable data entity using a language-based machine learning model. In some embodiments, the predictive data analysis computing entity 106 first determines, based at least in part on the plurality of time bound code transition likelihood data objects and/or the set of cross-code relationship values as described for example by a cross-code relationship value matrix, one or more inferred occurrence pathways of the set of individual historic code occurrences. Afterward, for each inferred occurrence pathway, the predictive data analysis computing entity 106 generates a per-pathway text representation. Then, the predictive data analysis computing entity 106 determines, based at least in part on a sequence of each per-pathway text representation and using a language-based machine learning model, an inferred subset of the plurality of defined occurrence codes for the predictive entity.

In some embodiments, an inferred occurrence pathway describes a subset of the set of historic code occurrences for an identifiable data entity (referred to herein the set of individual historic code occurrences for the identifiable data entity) that are deemed to be in order of their actual disease progression. For example, within a set of ICD code occurrences for a patient identifiable data entity, those occurrences that relate to skin conditions may form one inferred occurrence pathway, while those occurrences that relate to flu-related conditions may form another inferred occurrence pathway. In some embodiments, inferred occurrence pathways of historic code occurrences may be determined based at least in part on measures of associations between defined code occurrences, where the noted measures of associations may be determined based at least in part on at least one of time bound code transition likelihood data objects and cross-code relationship values (e.g., based at least in part on at least one of time bound code transition likelihood data objects and a cross-code relationship value matrix describing cross-code relationship values for a set of code pairs each comprising two defined occurrence codes).

In some embodiments, a language-based machine learning model may describe any machine learning model that is configured to process text data in order to generate n next tokens in the text data, where n may for example be one. In some embodiments, the language-based machine learning model is configured to process a sequence of per-pathway text representations for one or more inferred occurrence pathways of the set of individual historic code occurrences of the identifiable data entity to generate n next tokens in the sequence, where the n next tokens may then be used to generate a set of defined occurrence groupings which may in turn be used to generate the future occurrence code prediction for the identifiable data entity. In some embodiments, the language-based machine learning model is a natural language processing (NLP) machine learning model. In some embodiments, the language-based machine learning model is trained using an encoder-decoder framework. An example of a language-based machine learning model that may be used in accordance with various embodiments of the present invention is a Bidirectional Encoder for Representational Transformer (BERT) model, such as a retrained BERT model. In some embodiments, the input to a language-based machine learning model comprises a set and/or a sequence of vectors each describing a token (e.g., with each token comprising the Word2Vec representation of a word). In some embodiments, the outputs of a language-based machine learning model comprise a set and/or a sequence of vectors each describing a predicted token (e.g., with each token comprising the Word2Vec representation of a predicted word that corresponds to an ICD code).

In some embodiments, the predictive data analysis computing entity 106 determines that two defined occurrence codes should be in the same inferred occurrence pathway if at least one of (e.g., both of) the following is satisfied: (i) at least n (e.g., at least one) time bound code transition likelihood object for a code pair comprising the two defined occurrence codes satisfies a threshold, and (ii) the cross-code relationship value for a code pair comprising the two defined occurrence codes satisfies a threshold. For example, the predictive data analysis computing entity 106 may determines that two ICD codes should be in the same inferred occurrence pathway if at least one of (e.g., both of) the following is satisfied: (i) at least n (e.g., at least one) time bound code transition likelihood object for an ICD code pair comprising the two ICD codes satisfies a threshold, and (ii) the cross-code relationship value for an ICD code pair comprising the two ICD codes satisfies a threshold. In some embodiments, n may be a tuned hyper-parameter of the predictive data analysis system 101. In some embodiments, either or both of the two threshold values described above may be a tuned hyper-parameter of the predictive data analysis system 101.

In some embodiments, the predictive data analysis computing entity 106 determines that, given historic occurrence of a first set of individual code occurrences for an identifiable data entity, a second defined occurrence code should be in the third subset described above if the trained language-based machine learning model predicts a text representation of the second defined occurrence code as an output of processing a sequence of per-pathway text representations for inferred occurrence pathways of the first set of individual code occurrences. For example, the predictive data analysis computing entity 106 may determine that, given historic occurrence of a first set of individual ICD code occurrences for a patient identifiable data entity, a second ICD code should be in the third subset described above if the trained language-based machine learning model predicts a text representation of the second ICD code as an output of processing a sequence of per-pathway text representations for inferred occurrence pathways of the first set of individual ICD code occurrences.

In some embodiments, the predictive data analysis computing entity 106 determines that, given historic occurrence of a first set of individual code occurrences for an identifiable data entity, a second defined occurrence code should be in the third subset described above if the trained language-based machine learning model predicts a threshold-satisfying prediction score for a text representation of the second defined occurrence code as an output of processing a sequence of per-pathway text representations for inferred occurrence pathways of the first set of individual code occurrences. For example, the predictive data analysis computing entity 106 may determine that, given historic occurrence of a first set of individual ICD code occurrences for a patient identifiable data entity, a second ICD code should be in the third subset described above if the trained language-based machine learning model predicts a threshold-satisfying prediction score for a text representation of the second ICD code as an output of processing a sequence of per-pathway text representations for inferred occurrence pathways of the first set of individual ICD code occurrences.

An operational example of a sequence of per-pathway text representations for two inferred occurrence pathways is depicted in FIG. 14. As depicted in FIG. 14, the depicted sequence includes the subsequence 1401 that is associated with a first inferred occurrence pathway and the subsequence 1402 that is associated with a second inferred occurrence pathway, where both inferred occurrence pathways are determined from the set of individual code occurrences 1411 (e.g., based at least in part on the plurality of time bound code transition likelihood data objects and/or the set of cross-code relationship values as described for example by a cross-code relationship value matrix). Therefore, the depicted sequence does not include a chronological ordering of text representations of defined occurrence codes, but is instead generated based at least in part on an ordering that groups the text representations based at least in part on inferred occurrence pathways, which distinguish between subject matter of described conditions.

Returning to FIG. 4, at step/operation 406, the predictive data analysis computing entity 106 generates a fourth subset of individual code occurrences for the identifiable data entity based at least in part on external data sources other than the set of individual code occurrences for the patient identifiable data entity. For example, in some embodiments, the predictive data analysis computing entity 106 generates the fourth subset based at least in part on conditions associated with ICD codes for which a patient identifiable data entity has a threshold-satisfying PRS score.

In some embodiments, the predictive data analysis computing entity 106 determines that a first defined occurrence code is in the fourth subset described above if an externally-based score for the identifiable data entity in relation to the first defined occurrence code satisfies a threshold. For example, the predictive data analysis computing entity 106 may in some embodiments determine that a first ICD code is in the fourth subset described above if a PRS score and/or other genomics-based score for a corresponding patient identifiable data entity in relation to the first ICD code satisfies a threshold. In some embodiments, the noted threshold is a tuned hyper-parameter of the predictive data analysis system 101.

At step/operation 407, the predictive data analysis computing entity 106 generates the future occurrence code prediction based at least in part on the four subsets of defined occurrence codes determined above. The future occurrence prediction may describe a selected subset of a set of defined occurrence codes that are predicted to occur in the future in relation to a corresponding predictive entity (e.g., in relation to a corresponding patient identifiable data entity) based at least in part on a set of individual historic code occurrences for the corresponding identifiable data entity. In some embodiments, the predictive data analysis computing entity 106 generates the future occurrence code prediction by combining (e.g., performing a union operation across) on the four subsets of defined occurrence codes determined above. In some embodiments, the predictive data analysis computing entity 106 generates the future occurrence code prediction by performing an intersection operation across the four subsets of defined occurrence codes determined above.

In some embodiments, the selected subset of defined occurrence codes that are described by a future occurrence code prediction comprise at least one (e.g., all of) of the following subsets: (i) a first subset of defined occurrence codes that are determined based at least in part on determining occurrence codes that are deemed likely to occur within defined time bounds of individual historic code occurrences for the identifiable data entity in accordance with a plurality of time bound code transition likelihood data objects each associated with a defined time bound of a plurality of defined time bounds, (ii) a second subset of defined occurrence codes that are determined based at least in part on determining occurrence codes that are deemed related to occurrence codes described by individual historic code occurrences for the identifiable data entity in accordance with a set of cross-code relationship values for code pairs, (iii) a third subset of defined occurrence codes that are determined based at least in part on processing text-based representations of individual historic code occurrences for the identifiable data entity using aa language-based machine learning model, and (iv) a fourth subset of defined occurrence codes that are determined based at least in part on one or more genetic risk scores for an identifiable data entity that is a patient identifiable data entity (e.g., one or more PRS scores for a patient identifiable data entity).

At step/operation 408, the predictive data analysis computing entity 106 performs one or more prediction-based actions based at least in part on the future occurrence code prediction. Examples of prediction-based actions that may be performed based at least in part on the future occurrence prediction include automatically generating patient alerts, automatically generating physician alerts, automatically scheduling medical appointments, automatically scheduling prescription reminders, automatically performing fraud detection on one or more medical claims, automatically clinical pathway detection using one or more medical claims, and/or the like.

In some embodiments, performing the one or more predictions-based actions comprises generating (e.g., causing a client computing entity 102 to display, via transmitting user interface data to the client computing entity 102) a prediction output user interface that describes the defined occurrence code predictions for a selected identifiable data entity. An operational example of such a prediction output user interface 1500 is depicted in FIG. 15. As depicted in FIG. 15, the prediction output user interface 1500 describes the predicted ICD codes that are predicted to occur in relation to a patient identifiable data entity that is selected via providing the member identifier for the patient identifiable data entity, where the noted member identifier can be provided using the input field 1501. As depicted in FIG. 15, each ICD code prediction describes the method through which the ICD is predicted, which in turn enables the user to have an informed understanding of the bases for the ICD code predictions presented using the prediction output user interface 1500.

Accordingly, various embodiments of the present invention address technical challenges associated with improving the efficiency of predictive data analysis systems that are configured to perform predictive data analysis operations on coded data by providing techniques that utilize liner operations associated with time bound code transition likelihood data objects to perform the noted predictive data analysis solutions. By using time bound code transition likelihood data objects, various embodiments of the present invention reduce the computational complexity of real-time operations to predict future occurrence codes for identifiable data entities. This is because time bound code transition likelihood data objects contain valuable data that enable linear operations configured to utilize historical code occurrences for an identifiable data entity to predict future code occurrence expectations for the identifiable data entity. By utilizing time bound code transition likelihood data objects each associated with a defined time bound to perform future occurrence code prediction, various embodiments of the present invention enable efficient real-time future occurrence code prediction in real-time. In some embodiments, the time bound code transition likelihood data objects can further be utilized to facilitate efficient and reliable future occurrence code prediction using language-based machine learning models, thus further improving efficiency and reliability of predictive data analysis systems that are configured to perform predictive data analysis operations on coded data.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:
1. A computer-implemented method comprising:
identifying, by one or more processors, a plurality of time bound code transition likelihood data objects for an entity cluster that is associated with an identifiable data entity, wherein: (i) a time bound code transition likelihood data object of the plurality of time bound code transition likelihood data objects is associated with a defined time bound of a plurality of defined time bounds, (ii) the time bound code transition likelihood data object for the defined time bound describes, for a code pair comprising a first defined occurrence code of a plurality of defined occurrence codes and a second defined occurrence code of the plurality of defined occurrence codes, an inferred likelihood that the second defined occurrence code occurs within the defined time bound of an assumed occurrence of the first defined occurrence code, and (iii) the time bound code transition likelihood data object is generated for the defined time bound by:
  identifying a plurality of per-entity code occurrences for the entity cluster, wherein a per-entity code occurrence of the plurality of per-entity code occurrences describes that a corresponding defined occurrence code occurs in relation to a corresponding identifiable data entity in the entity cluster at a corresponding timestamp, and
  generating the time bound code transition likelihood data object based at least in part on the plurality of per-entity code occurrences;
generating, by the one or more processors and based at least in part on the plurality of time bound code transition likelihood data objects and a plurality of individual historic code occurrences for the identifiable data entity, a future occurrence code prediction, for the identifiable data entity, comprising a selected subset of the plurality of defined occurrence codes; and
initiating, by the one or more processors, one or more prediction-based actions based at least in part on the future occurrence code prediction.

2. The computer-implemented method of claim 1, further comprising:
determining an entity-code occurrence data object for the entity cluster based at least in part on the plurality of per-entity code occurrences; and
generating an augmented entity-code occurrence data object based at least in part on the entity-code occurrence data object.

3. The computer-implemented method of claim 2, wherein generating the augmented entity-code occurrence data object comprises:

performing singular value decomposition on the entity-code occurrence data object to generate a plurality of target lower-ranked entity-code occurrence data objects;

determining at least one missing value in the entity-code occurrence data object based at least in part on the plurality of target lower-ranked entity-code occurrence data objects; and generating the augmented entity-code occurrence data object based at least in part on the at least one missing value.

4. The computer-implemented method of claim 2, wherein generating the time bound code transition likelihood data object based at least in part on the plurality of per-entity code occurrences comprises:

determining a plurality of augmented per-entity code occurrences for the entity cluster based at least in part on the plurality of per-entity code occurrences and the augmented entity-code occurrence data object;

determining a time bound code transition document that describes all co-occurrences of code pairs from the plurality of defined occurrence codes associated with the plurality of augmented per-entity code occurrences that occur within the defined time bound; and generating the time bound code transition likelihood data object based at least in part on the time bound code transition document.

5. The computer-implemented method of claim 4, wherein generating the time bound code transition likelihood data object based at least in part on the time bound code transition document comprises:

determining a time bound code transition likelihood object for the code pair based at least in part on a per-document occurrence of the code pair as described by the time bound code transition document for the defined time bound and a cross-document occurrence of the code pair as described by the time bound code transition document; and generating the time bound code transition likelihood data object based at least in part on the time bound code transition likelihood object.

6. The computer-implemented method of claim 5, wherein the time bound code transition likelihood object is a term-frequency-inverse-domain-frequency measure.

7. The computer-implemented method of claim 1, wherein generating the selected subset comprises:

generating a first subset of the plurality of defined occurrence codes based at least in part on the plurality of time bound code transition likelihood data objects and the plurality of individual historic code occurrences for the identifiable data entity;

generating a second subset of the plurality of defined occurrence codes based at least in part on a cross-code relationship value for a code pair; and generating the selected subset based at least in part on the first subset and the second subset.

8. The computer-implemented method of claim 1, wherein generating the selected subset comprises:

determining, based at least in part on the plurality of time bound code transition likelihood data objects, a plurality of inferred occurrence pathways of the plurality of individual historic code occurrences;

generating a plurality of per-pathway text representations corresponding to the plurality of inferred occurrence pathways;

determining, based at least in part on a sequence of the plurality of per-pathway text representations and using a language-based machine learning model, an inferred subset of the plurality of defined occurrence codes for a predictive entity; and generating the selected subset based at least in part on the inferred subset.

9. A system comprising:

one or more processors; and at least one memory storing processor-executable instructions that, when executed by any one or more of the one or more processors, cause the one or more processors to perform operations comprising:

identifying a plurality of time bound code transition likelihood data objects for an entity cluster that is associated with an identifiable data entity, wherein: (i) a time bound code transition likelihood data object of the plurality of time bound code transition likelihood data objects is associated with a defined time bound of a plurality of defined time bounds, (ii) the time bound code transition likelihood data object for the defined time bound describes, for a code pair comprising a first defined occurrence code of a plurality of defined occurrence codes and a second defined occurrence code of the plurality of defined occurrence codes, an inferred likelihood that the second defined occurrence code occurs within the defined time bound of an assumed occurrence of the first defined occurrence code, and (iii) the time bound code transition likelihood data object is generated for the defined time bound by:

identifying a plurality of per-entity code occurrences for the entity cluster, wherein a per-entity code occurrence of the plurality of per-entity code occurrences describes that a corresponding defined occurrence code occurs in relation to a corresponding identifiable data entity in the entity cluster at a corresponding timestamp, and generating the time bound code transition likelihood data object based at least in part on the plurality of per-entity code occurrences;

generating, based at least in part on the plurality of time bound code transition likelihood data objects and a plurality of individual historic code occurrences for the identifiable data entity, a future occurrence code prediction, for the identifiable data entity, comprising a selected subset of the plurality of defined occurrence codes; and initiating one or more prediction-based actions based at least in part on the future occurrence code prediction.

10. The system of claim 9, wherein the operations further comprise:

determining an entity-code occurrence data object for the entity cluster based at least in part on the plurality of per-entity code occurrences; and generating an augmented entity-code occurrence data object based at least in part on the entity-code occurrence data object.

11. The system of claim 10, wherein generating the augmented entity-code occurrence data object comprises:

performing singular value decomposition on the entity-code occurrence data object to generate a plurality of target lower-ranked entity-code occurrence data objects;

determining at least one missing value in the entity-code occurrence data object based at least in part on the plurality of target lower-ranked entity-code occurrence data objects; and generating the augmented entity-code occurrence data object based at least in part on the at least one missing value.

12. The system of claim 10, wherein generating the time bound code transition likelihood data object based at least in part on the plurality of per-entity code occurrences comprises:
   determining a plurality of augmented per-entity code occurrences for the entity cluster based at least in part on the plurality of per-entity code occurrences and the augmented entity-code occurrence data object;
   determining a time bound code transition document that describes all co-occurrences of code pairs from the plurality of defined occurrence codes associated with the plurality of augmented per-entity code occurrences that occur within the defined time bound; and
   generating the time bound code transition likelihood data object based at least in part on the time bound code transition document.

13. The system of claim 12, wherein generating the time bound code transition likelihood data object based at least in part on the time bound code transition document comprises:
   determining a time bound code transition likelihood object for the code pair based at least in part on a per-document occurrence of the code pair as described by the time bound code transition document for the defined time bound and a cross-document occurrence of the code pair as described by the time bound code transition document; and
   generating the time bound code transition likelihood data object based at least in part on the time bound code transition likelihood object.

14. The system of claim 13, wherein the time bound code transition likelihood object is a term-frequency-inverse-domain-frequency measure.

15. The system of claim 9, wherein generating the selected subset comprises:
   generating a first subset of the plurality of defined occurrence codes based at least in part on the plurality of time bound code transition likelihood data objects and the plurality of individual historic code occurrences for the identifiable data entity;
   generating a second subset of the plurality of defined occurrence codes based at least in part on a cross-code relationship value for a code pair; and
   generating the selected subset based at least in part on the first subset and the second subset.

16. The system of claim 9, wherein generating the selected subset comprises:
   determining, based at least in part on the plurality of time bound code transition likelihood data objects, a plurality of inferred occurrence pathways of the plurality of individual historic code occurrences;
   generating a plurality of per-pathway text representations corresponding to the plurality of inferred occurrence pathways;
   determining, based at least in part on a sequence of the plurality of per-pathway text representations and using a language-based machine learning model, an inferred subset of the plurality of defined occurrence codes for a predictive entity; and
   generating the selected subset based at least in part on the inferred subset.

17. One or more non-transitory computer-readable storage media including instructions that, when executed by one or more processors, cause the one or more processors to perform operations comprising:
   identifying a plurality of time bound code transition likelihood data objects for an entity cluster that is associated with an identifiable data entity, wherein: (i) a time bound code transition likelihood data object of the plurality of time bound code transition likelihood data objects is associated with a defined time bound of a plurality of defined time bounds, (ii) the time bound code transition likelihood data object for the defined time bound describes, for a code pair comprising a first defined occurrence code of a plurality of defined occurrence codes and a second defined occurrence code of the plurality of defined occurrence codes, an inferred likelihood that the second defined occurrence code occurs within the defined time bound of an assumed occurrence of the first defined occurrence code, and (iii) the time bound code transition likelihood data object is generated for the defined time bound by:
      identifying a plurality of per-entity code occurrences for the entity cluster, wherein a per-entity code occurrence of the plurality of per-entity code occurrences describes that a corresponding defined occurrence code occurs in relation to a corresponding identifiable data entity in the entity cluster at a corresponding timestamp, and
      generating the time bound code transition likelihood data object based at least in part on the plurality of per-entity code occurrences;
   generating, based at least in part on the plurality of time bound code transition likelihood data objects and a plurality of individual historic code occurrences for the identifiable data entity, a future occurrence code prediction, for the identifiable data entity, comprising a selected subset of the plurality of defined occurrence codes; and
   initiating one or more prediction-based actions based at least in part on the future occurrence code prediction.

18. The one or more non-transitory computer-readable storage media of claim 17, wherein the operations further comprise:
   determining an entity-code occurrence data object for the entity cluster based at least in part on the plurality of per-entity code occurrences; and
   generating an augmented entity-code occurrence data object based at least in part on the entity-code occurrence data object.

19. The one or more non-transitory computer-readable storage media of claim 18, wherein generating the augmented entity-code occurrence data object comprises:
   performing singular value decomposition on the entity-code occurrence data object to generate a plurality of target lower-ranked entity-code occurrence data objects;
   determining at least one missing value in the entity-code occurrence data object based at least in part on the plurality of target lower-ranked entity-code occurrence data objects; and
   generating the augmented entity-code occurrence data object based at least in part on the at least one missing value.

20. The one or more non-transitory computer-readable storage media of claim 18, wherein generating the time bound code transition likelihood data object based at least in part on the plurality of per-entity code occurrences comprises:
   determining a plurality of augmented per-entity code occurrences for the entity cluster based at least in part on the plurality of per-entity code occurrences and the augmented entity-code occurrence data object;

determining a time bound code transition document that describes all co-occurrences of code pairs from the plurality of defined occurrence codes associated with the plurality of augmented per-entity code occurrences that occur within the defined time bound; and generating the time bound code transition likelihood data object based at least in part on the time bound code transition document.

* * * * *